United States Patent
Matsushita et al.

(10) Patent No.: US 12,194,562 B2
(45) Date of Patent: Jan. 14, 2025

(54) ROTATING TOOL FOR DOUBLE-SIDED FRICTION STIR WELDING, DOUBLE-SIDED FRICTION STIR WELDING APPARATUS, AND DOUBLE-SIDED FRICTION STIR WELDING METHOD

(71) Applicant: JFE Steel Corporation, Tokyo (JP)

(72) Inventors: Muneo Matsushita, Tokyo (JP); Rinsei Ikeda, Tokyo (JP); Hiroshi Matsuda, Tokyo (JP); Daiki Yamagishi, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 372 days.

(21) Appl. No.: 16/980,098

(22) PCT Filed: Mar. 20, 2019

(86) PCT No.: PCT/JP2019/011734
§ 371 (c)(1),
(2) Date: Sep. 11, 2020

(87) PCT Pub. No.: WO2019/182020
PCT Pub. Date: Sep. 26, 2019

(65) Prior Publication Data
US 2021/0023650 A1    Jan. 28, 2021

(30) Foreign Application Priority Data

Mar. 20, 2018  (JP) ................. 2018-052622
Jan. 16, 2019  (JP) ................. 2019-005166

(51) Int. Cl.
*B23K 20/00*    (2006.01)
*B23K 20/12*    (2006.01)

(52) U.S. Cl.
CPC ...... *B23K 20/1255* (2013.01); *B23K 20/1225* (2013.01)

(58) Field of Classification Search
CPC ............ B23K 20/1255; B23K 20/1265; B23K 20/122; B23K 20/123; B23K 20/125
See application file for complete search history.

(56) References Cited

U.S. PATENT DOCUMENTS

| | | |
|---|---|---|
| 4,811,887 A | 3/1989 | King et al. |
| 5,460,317 A | 10/1995 | Thomas et al. |
| (Continued) | | |

FOREIGN PATENT DOCUMENTS

| | | |
|---|---|---|
| CN | 107150166 A | 9/2017 |
| EP | 2474382 A1 | 7/2012 |
| (Continued) | | |

OTHER PUBLICATIONS

JP4838385 computer translation (Year: 2022).*
(Continued)

*Primary Examiner* — Erin B Saad
(74) *Attorney, Agent, or Firm* — Buchanan Ingersoll & Rooney PC

(57) ABSTRACT

Disclosed are rotating tools for double-sided friction stir welding that are applied to double-sided friction stir welding, which is a technique for welding two metal plates by rotating a pair of rotating tools, which oppose each other, in opposite directions, a double-sided friction stir welding apparatus that uses the rotating tools, and a double-sided friction stir welding method. A pair of rotating tools for double-sided friction stir welding that are used in double-sided friction stir welding, which is a technique for welding metal plates by using a pair of rotating tools that are each disposed on one of first and second surfaces of an unwelded portion of the metal plates such that the rotating tools rotate in opposite directions, include end portions each of which is formed in a circular and planar shape. The end portions are each made of a material harder than the metal plates.

8 Claims, 9 Drawing Sheets

(56) References Cited

U.S. PATENT DOCUMENTS

| | | | |
|---|---|---|---|
| 7,882,998 B2* | 2/2011 | Roos | B23K 20/1265 |
| | | | 228/2.1 |
| 8,052,033 B2* | 11/2011 | Nakagawa | B29C 66/1162 |
| | | | 228/2.1 |
| 8,220,694 B2* | 7/2012 | Nakagawa | B23K 20/1255 |
| | | | 228/2.1 |
| 8,286,455 B2 | 10/2012 | Fujii et al. | |
| 2002/0158109 A1* | 10/2002 | Gendoh | B23K 20/1255 |
| | | | 228/2.1 |
| 2006/0086775 A1* | 4/2006 | Trapp | B23K 20/1225 |
| | | | 228/2.1 |
| 2006/0138197 A1* | 6/2006 | Aota | B23K 20/1265 |
| | | | 228/112.1 |
| 2006/0289608 A1* | 12/2006 | Steel | B23K 20/22 |
| | | | 228/101 |
| 2011/0132968 A1 | 6/2011 | Nakagawa et al. | |
| 2011/0135954 A1* | 6/2011 | Nakagawa | B29C 66/114 |
| | | | 428/615 |
| 2017/0157720 A1 | 6/2017 | Sato | |
| 2020/0164462 A1* | 5/2020 | Hori | F28F 3/12 |
| 2020/0254556 A1* | 8/2020 | Hori | B23K 20/1255 |
| 2020/0282489 A1* | 9/2020 | Hori | B23K 20/1255 |
| 2023/0143286 A1* | 5/2023 | Rodriguez Suarez | |
| | | | B23K 20/1255 |
| | | | 228/2.1 |

FOREIGN PATENT DOCUMENTS

| | | | |
|---|---|---|---|
| JP | 62183979 A | | 8/1987 |
| JP | 07505090 A | | 6/1995 |
| JP | 3261433 B2 | | 3/2002 |
| JP | 2003181655 A | | 7/2003 |
| JP | 2003290936 A | | 10/2003 |
| JP | 2004195480 A | | 7/2004 |
| JP | 2007301579 A | * | 11/2007 |
| JP | 2011115846 A | | 6/2011 |
| JP | 4838385 B2 | | 12/2011 |
| JP | 4838388 B2 | | 12/2011 |
| JP | 2012066287 A | | 4/2012 |
| JP | 5185103 B2 | | 4/2013 |
| JP | 2015127063 A | | 7/2015 |
| KR | 20020026887 A | | 4/2002 |
| KR | 20100073269 A | | 7/2010 |
| KR | 20170009978 A | | 1/2017 |
| WO | 0183153 A1 | | 11/2001 |
| WO | 2004110692 A1 | | 12/2004 |

OTHER PUBLICATIONS

JP-2007301579—A computer English translation (Year: 2023).*
Computer English Translation of KR20110088266A (Year: 2011).*
Chinese Office Action for Chinese Application No. 201980019963.7, dated Jul. 2, 2021 with Concise Statement of Relevance of Office Action, 12 pages.
Extended European Search Report for European Application No. 19 772 150.9, dated Mar. 26, 2021, 7 pages.
Korean Office Action for Korean Application No. 10-2020-7026318, dated Jun. 21, 2021, with Concise Statement of Relevance of Office Action, 6 pages.
Japanese Office Action for Japanese Application No. 2019-529679, dated Jun. 30, 2020, with Concise Statement of Relevance of Office Action, 5 pages.
International Search Report and Written Opinion for International Application No. PCT/JP2019/011734, dated May 12, 2019, 7 pages.
Extended European Search Report for European Application No. 22195812.7, dated Jan. 10, 2023, 6 pages.

* cited by examiner

FIG. 3
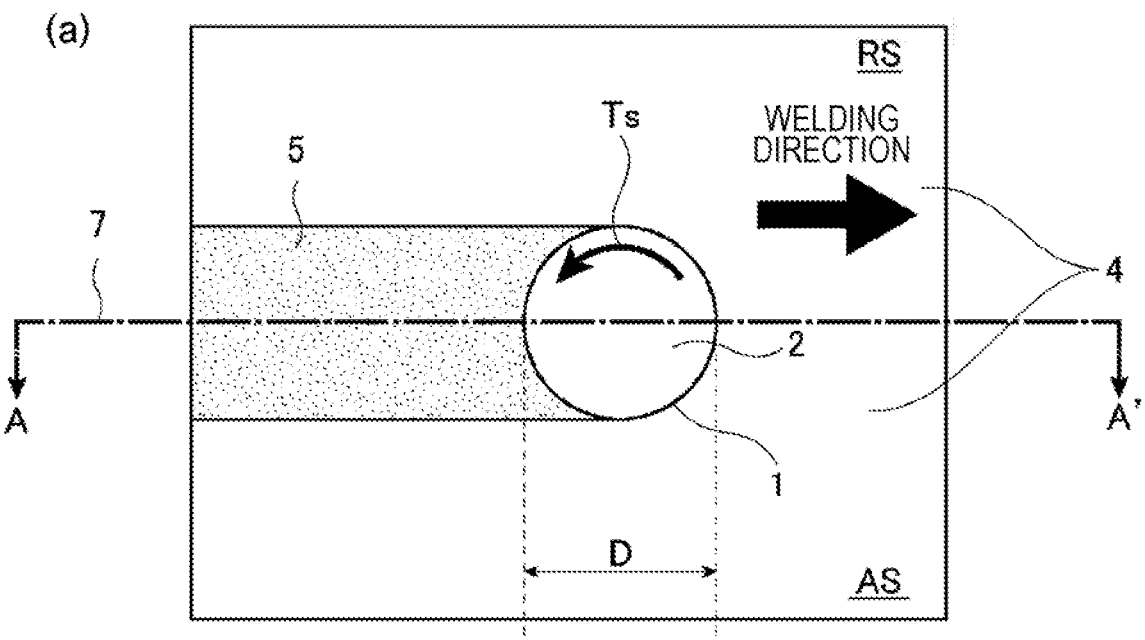
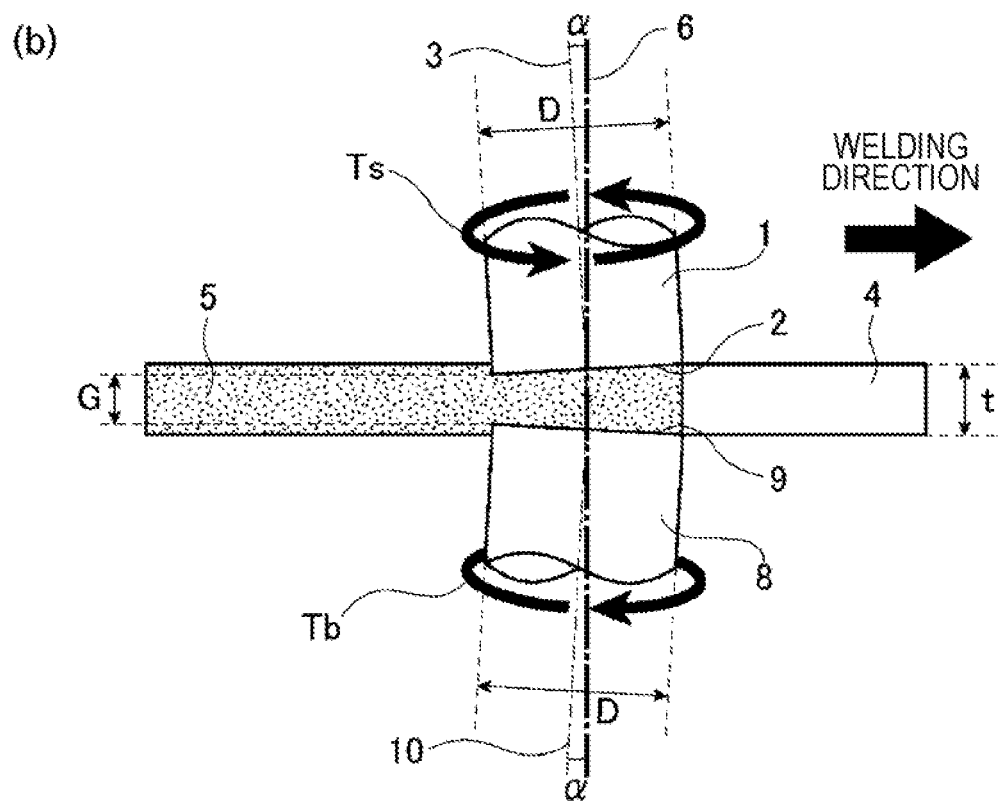

FIG. 9
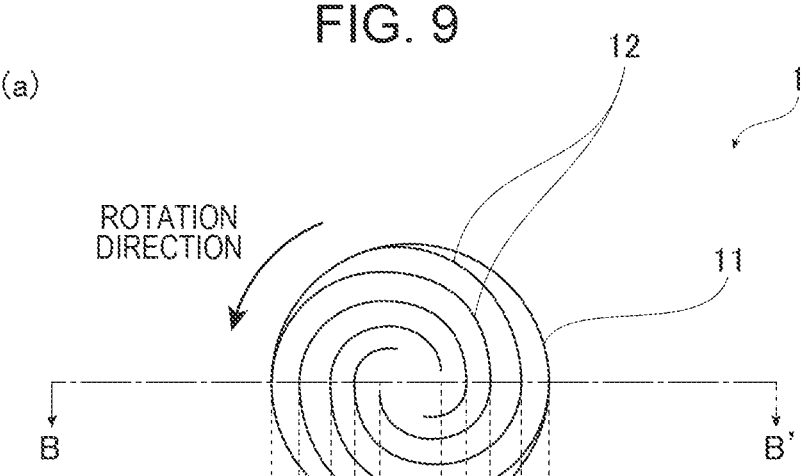
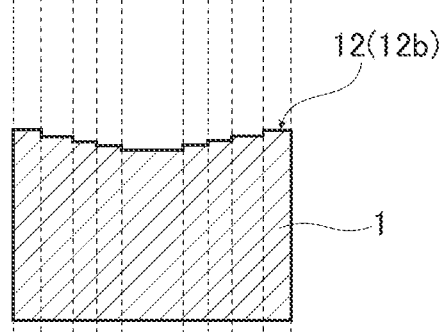
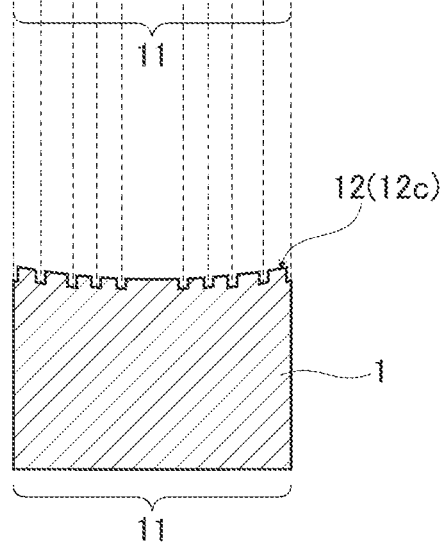

ROTATING TOOL FOR DOUBLE-SIDED FRICTION STIR WELDING, DOUBLE-SIDED FRICTION STIR WELDING APPARATUS, AND DOUBLE-SIDED FRICTION STIR WELDING METHOD

CROSS REFERENCE TO RELATED APPLICATIONS

This is the U.S. National Phase application of PCT/JP2019/011734, filed Mar. 20, 2019, which claims priority to Japanese Patent Application No. 2018-052622, filed Mar. 20, 2018 and Japanese Patent Application No. 2019-005166, filed Jan. 16, 2019, the disclosures of these applications being incorporated herein by reference in their entireties for all purposes.

FIELD OF THE INVENTION

The present invention relates to a rotating tool for double-sided friction stir welding that is applied to double-sided friction stir welding, which is a technique for welding two metal plates by rotating a pair of rotating tools, which oppose each other, in opposite directions, a double-sided friction stir welding apparatus that uses the rotating tools for double-sided friction stir welding, and a double-sided friction stir welding method.

BACKGROUND OF THE INVENTION

Patent Literature 1 discloses a technique for welding a pair of members such as metal plates by rotating both or one of the metal plates so as to generate heat that softens the metal plates and stirring softened portions so as to cause plastic flow.

However, in the technique described in Patent Literature 1, it is necessary to rotate a member that is a welding target such as a metal plate, and thus, there are limitations on the shape and the dimensions of a member to be welded such as a metal plate.

In contrast, as a friction welding technique different from Patent Literature 1, for example, Patent Literature 2 discloses a method for continuously welding metal plates in the longitudinal direction by using heat generated between a rotating tool and the metal plates and plastic flow by inserting the rotating tool (hereinafter sometimes simply referred to as "tool") that has a probe (hereinafter sometimes simply referred to as "pin") made of a material substantially harder than a workpiece, such as a metal plate, into an unwelded portion of the metal plates and causing the tool to move while rotating. Note that, in the present specification, a portion in which metal plates are butted together or arranged so as to overlap each other, the portion having not yet been welded, will hereinafter be referred to as "an unwelded portion", and a portion that has been welded and integrated will hereinafter be referred to as "a welded portion".

As described above, the friction welding method described in Patent Literature 1 is a method in which metal plates are rotated so as to generate frictional heat therebetween, and the metal plates are welded together by the frictional heat. In contrast, the friction stir welding described in Patent Literature 2 is a method in which metal plates are fixed in place and welded together by a rotating tool that moves while rotating. Thus, the friction stir welding method has an advantage in that, even if a member has a substantially infinite length in a welding direction, solid-state welding can be continuously performed on the member in the longitudinal direction of the member. In addition, since the friction stir welding method is solid-state welding that uses plastic flow of a metal caused by frictional heat generated between a rotating tool and metal plates, welding can be performed without melting an unwelded portion. Furthermore, the friction stir welding method has many advantages of, for example, less deformation after welding because of low heating temperature, fewer defects in a welded portion as a result of not melting metal plates, and no necessity for a filler material.

A friction stir welding method has a wide range of applications in the fields such as aircrafts, ships, railway vehicles, and automobiles as a method of welding low-melting-point metal materials, representative examples of which are an aluminum alloy and a magnesium alloy. This is because, in the case of such low-melting-point metal materials, when an arc welding method of the related art is used, it is difficult to obtain welded portions with satisfactory properties, but the use of the friction stir welding method can improve productivity and obtain a welded portion (a joint) having a high quality.

By using the friction stir welding method for structural steel mainly used as a material of structures such as buildings, ships, heavy equipment, pipelines and automobiles, solidification cracking and hydrogen cracking, which have been problems in fusion welding of the related art can be avoided, and changes in the structures of steel materials are suppressed, so that improvement in joint performance can be expected. In addition, stirring a welding interface with a rotating tool can create clean surfaces, and these clean surfaces can be brought into contact with each other, so that another advantage in that no pre-treatment step is necessary unlike in diffusion bonding can also be expected. As described above, the use of the friction stir welding method for structural steel has many anticipated advantages. However, the use of the friction stir welding method for structural steel still has problems concerning the welding workability, such as suppression of occurrence of a defect in a joint during welding and an increase in welding speed, and thus, the use of the friction stir welding method for structural steel has been less popular than the use of the friction stir welding method for low-melting-point metal materials. Examples of the above-mentioned defect in a joint include a shape failure and a weld failure on a joint surface or in a joint especially immediately after welding.

Principal factors in the occurrence of defects in the above friction stir welding method described in Patent Literature 2 include variations in temperature and plastic flow that occur in the thickness direction of metal plates. More specifically, in the case where a rotating tool is disposed only on first surfaces of metal plates, plastic flow that is sufficient to achieve a metallurgically favorable welded state can be obtained on the first surface side, whereas the plastic flow obtained on the second surface side is often insufficient because a temperature rise in the unwelded portion and a shearing stress applied as a load thereto during welding are insufficient.

In the case where the friction stir welding method described in Patent Literature 2 is used for structural steel, since the strength of the structural steel, which is a workpiece, is high at a high temperature, when the heat input is low, and the welding speed is high, sufficient plastic flow cannot be obtained in the unwelded portion in many cases. Thus, it is difficult to increase the welding speed while suppressing the occurrence of defects during welding.

As means for solving such problems, for example, Patent Literatures 3, 4, and 5 each disclose a double-sided friction stir welding method. In the double-sided friction stir welding method, a pair of rotating tools opposing each other are pressed against the two surfaces, the first surface and the second surface, of a welding portion of metal plates (workpieces), so that plastic flow that is uniform and sufficient in the thickness direction of the workpieces can be obtained. As a result, an increase in the welding speed can be achieved while occurrence of defects in a joint during welding is suppressed.

In addition, in order to make the use of the friction stir welding method for structural steel more popular, it is necessary to improve the durability and the service life of a tool. This is because, if, repair is required due to breakage and wear of a tool, so that it is anticipated that a weld failure will occur with a high probability, it is determined to be difficult to practically apply the friction stir welding method to structural steel even with the advantageous features (effects) such as those described above.

A common friction stir welding method uses a rotating tool that includes a protruding probe, which is formed at an end thereof and at the center of the rotation axis thereof, and a shoulder portion having a flatter shape around the probe, and the rotating tool is caused to perform a translational movement while rotating in a state where the probe is inserted in an unwelded portion, so that workpieces may be welded together. Consequently, a large load is applied to the probe during welding, and thus, the probe is especially likely to break or become worn among the parts constituting the rotating tool.

As examples of a technique for avoiding breakage or the like of a probe, Patent Literatures 6 to 11 each disclose friction stir welding using a rotating tool that has an end portion having a planar shape and that does not have a probe.

PATENT LITERATURE

Patent Literature 1: Japanese Unexamined Patent Application Publication No. 62-183979
Patent Literature 2: Japanese Unexamined Patent Application Publication (Translation of PCT Application) No. 7-505090
Patent Literature 3: Japanese Patent No. 3261433
Patent Literature 4: Japanese Patent No. 4838385
Patent Literature 5: Japanese Patent No. 4838388
Patent Literature 6: Japanese Patent No. 5185103
Patent Literature 7: Japanese Unexamined Patent Application Publication No. 2015-127063
Patent Literature 8: Japanese Unexamined Patent Application Publication No. 2003-181655
Patent Literature 9: Japanese Unexamined Patent Application Publication No. 2003-290936
Patent Literature 10: Japanese Unexamined Patent Application Publication No. 2004-195480
Patent Literature 11: Japanese Unexamined Patent Application Publication No. 2011-115846

SUMMARY OF THE INVENTION

However, an object of each of the techniques disclosed in Patent Literatures 6 and 7 is to reinforce a welded portion or to harden a metal surface, and these techniques do not consider any application to welding of metal plates. Although the end portion of the rotating tool disclosed in each of these techniques has a flat surface or a planar surface, there is no description in Patent Literatures 6 and 7 about forming the end portion into a concave curved shape or a convex curved shape for the purpose of improving plastic flow. In addition, there is no description that the rotating tool of the related art described in Patent Literatures 6 and 7 mentioned above includes a vortex-shaped stepped portion formed to extend in a direction opposite to the rotation direction. Thus, in the case where the above-mentioned rotating tool of the related art is used for welding metal plates, there is a possibility that sufficient plastic flow will not be obtained in a plate-thickness direction, which in turn leads to a weld failure.

In addition, an object of each of the techniques disclosed in Patent Literatures 8 to 11 is to weld metal plates by a friction stir method, and these techniques do not consider any application to a double-sided friction stir welding method. In other words, in Patent Literatures 8 to 11, there is no disclosure of an appropriate relationship between the diameter of an end portion of a tool and the thickness of metal plates which are to be welded together in the double-sided friction stir welding method, and thus, there is a possibility that a indefective joint will not be obtained.

Aspects of the present invention have been completed in view of the above problems, and it is an object according to aspects of the present invention to provide rotating tools for double-sided friction stir welding that are applied to double-sided friction stir welding, which is a technique for welding two metal plates by rotating a pair of rotating tools, which oppose each other, in opposite directions, a double-sided friction stir welding apparatus that uses the rotating tools for double-sided friction stir welding, and a double-sided friction stir welding method.

Aspects of the present invention are as follows.

[1] A pair of rotating tools for double-sided friction stir welding that are used in double-sided friction stir welding, which is a technique for welding metal plates by using a pair of rotating tools that are each disposed on one of first and second surfaces of an unwelded portion of the metal plates such that the rotating tools rotate in opposite directions, the pair of rotating tools including end portions each of which is formed in a circular and planar shape, and the end portions are each made of a material harder than the metal plates.

[2] A pair of rotating tools for double-sided friction stir welding that are used in double-sided friction stir welding, which is a technique for welding metal plates by using a pair of rotating tools that are each disposed on one of first and second surfaces of an unwelded portion of the metal plates such that the rotating tools rotate in opposite directions, the pair of rotating tools including end portions each of which is formed in a circular and convex curved shape, and the end portions are each made of a material harder than the metal plates.

[3] A pair of rotating tools for double-sided friction stir welding that are used in double-sided friction stir welding, which is a technique for welding metal plates by using a pair of rotating tools that are each disposed on one of first and second surfaces of an unwelded portion of the metal plates such that the rotating tools rotate in opposite directions, the pair of rotating tools including end portions each of which is formed in a circular and concave curved shape, and the end portions are each made of a material harder than the metal plates.

[4] In the pair of rotating tools for double-sided friction stir welding described in any one of [1] to [3], each of the end portions has a vortex-shaped stepped portion that is formed so as to extend in a direction opposite to a rotation direction.

[5] In the pair of rotating tools for double-sided friction stir welding described in any one of [1] to [4], each of the end portions has a diameter D (mm) that satisfies formula (3):

$$4 \times t \leq D \leq 20 \times t \quad \text{formula (3)}$$

where t stands for thickness of each metal plate (mm).

[6] A double-sided friction stir welding apparatus including a pair of rotating tools that are each disposed on one of first and second surfaces of an unwelded portion of metal plates; and a control device that controls operations of the rotating tools, the pair of rotating tools rotate in opposite directions so as to weld the metal plates together, wherein the rotating tools are the pair of rotating tools for double-sided friction stir welding described in any one of [1] to [4].

[7] A double-sided friction stir welding apparatus including a pair of rotating tools that are each disposed on one of first and second surfaces of an unwelded portion of metal plates and a control device that controls operations of the rotating tools, wherein the pair of rotating tools rotate in opposite directions so as to weld the metal plates together, wherein the rotating tools are the pair of rotating tools for double-sided friction stir welding described in [5], and wherein the control device controls the rotating tools in such a manner as to satisfy formulas (1) and (2) described below.

$$0 \leq \alpha \leq 3 \quad (1)$$

$$0.25 \times t - 0.2 \times D \times \sin \alpha \leq G \leq 0.8 \times t - 0.2 \times D \times \sin \alpha \quad (2)$$

α(°): inclination angle of rotating tool, G (mm): distance between end portions of pair of rotating tools

[8] A double-sided friction stir welding method by which metal plates are welded together by using a pair of rotating tools that are each disposed on one of first and second surfaces of an unwelded portion of the metal plates such that the rotating tools rotate in opposite directions, wherein the pair of rotating tools for double-sided friction stir welding described in any one of [1] to [4] are used as the rotating tools.

[9] A double-sided friction stir welding method by which metal plates are welded together by using a pair of rotating tools that are each disposed on one of first and second surfaces of an unwelded portion of the metal plates such that the rotating tools rotate in opposite directions, wherein the pair of rotating tools for double-sided friction stir welding described in [5] are used as the rotating tools, and wherein an inclination angle α(°) of each of the rotating tools and a distance G (mm) between end portions of the pair of rotating tools are set to satisfy formulas (1) and (2) described below.

$$0 \leq \alpha \leq 3 \quad (1)$$

$$0.25 \times t - 0.2 \times D \times \sin \alpha \leq G \leq 0.8 \times t - 0.2 \times D \times \sin \alpha \quad (2)$$

According to aspects of the present invention, rotating tools for double-sided friction stir welding each of which does not have a probe at an end thereof can be provided, and the rotating tools are suitably used in a double-sided friction stir welding apparatus that welds two metal plates by rotating a pair of rotating tools, which oppose each other, in opposite directions and in a double-sided friction stir welding method. The rotating tools for double-sided friction stir welding according to aspects of the present invention facilitates plastic flow uniformly in the thickness direction of metal plates, and thus, a joint that has a sufficient strength and in which occurrence of a defect is suppressed can be obtained at a high welding speed. In addition, a probe that preferentially becomes broken and worn as a result of receiving a stress greater than the stress received by a shoulder portion in a rotating tool of the related art can be eliminated, and thus, the durability of each of the rotating tools for double-sided friction stir welding can be improved.

BRIEF DESCRIPTION OF THE DRAWINGS

FIG. 3 is a diagram illustrating a region in which friction stirring is performed by using the rotating tools, and FIG. 3(a) and FIG. 3(b) are respectively a plan view and a sectional view taken along line A-A' of FIG. 3(a).

FIG. 8(a) is a plan view, and FIG. 8(b) and FIG. 8(c) are a sectional views taken along line B-B' of FIG. 8(a), respectively.

FIG. 9 illustrates shapes of concave stepped portions included in one of the rotating tools for double-sided friction stir welding according to aspects of the present invention. FIG. 9(a) is a plan view, and FIG. 9(b) and FIG. 9(c) are a sectional views taken along line B-B' of FIG. 9(a), respectively.

DETAILED DESCRIPTION OF EMBODIMENTS OF THE INVENTION

A rotating tool for double-sided friction stir welding according to aspects of the present invention will be described below with reference to the drawings. Note that the present invention is not limited to the following embodiments.

Figure 1:
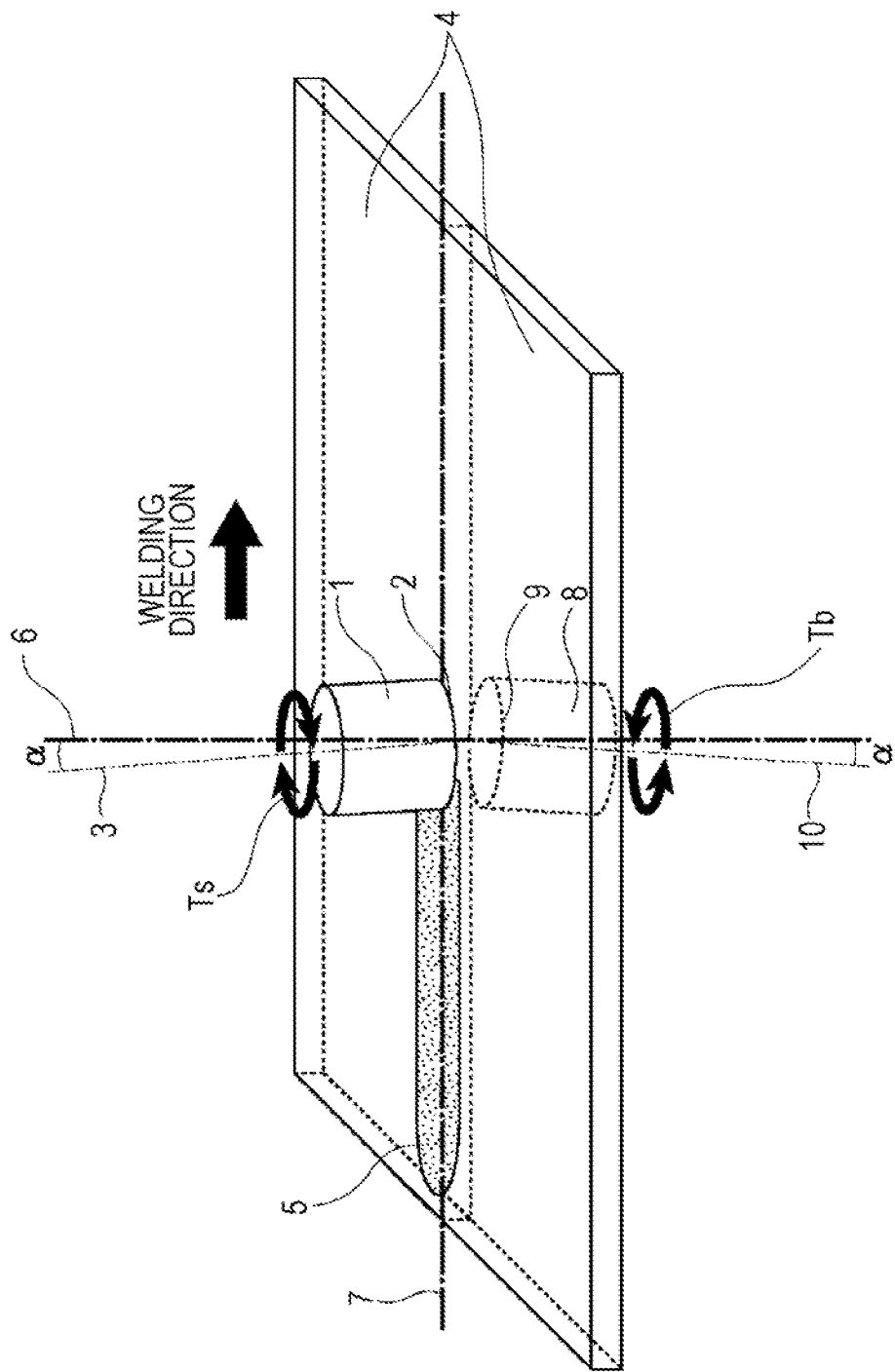
FIG. 1 is a schematic diagram illustrating a double-sided friction stir welding method to which rotating tools for double-sided friction stir welding according to aspects of the present invention are applied and illustrating an example of butt welding.
Figure 2:
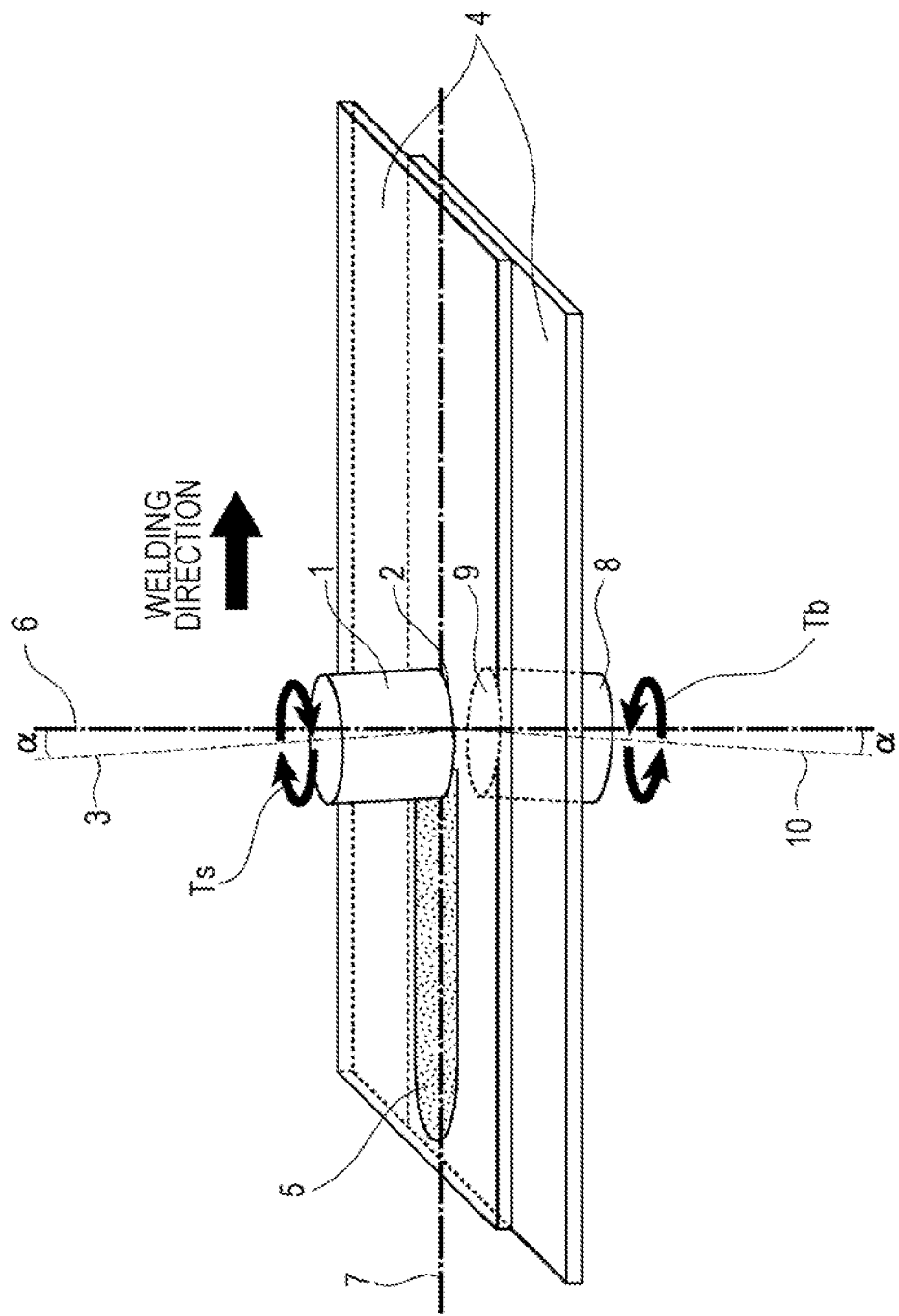
FIG. 2 is a schematic diagram illustrating a double-sided friction stir welding method to which the rotating tools for double-sided friction stir welding according to aspects of the present invention are applied and illustrating an example of lap welding.

First, a double-sided friction stir welding method to which the rotating tools for double-sided friction stir welding according to aspects of the present invention (hereinafter referred to as "rotating tools") are applicable will be described. FIG. 1 illustrates an example of butt welding using a double-sided friction stir welding method. FIG. 2 illustrates an example of lap welding using a double-sided friction stir welding method.

As illustrated in FIG. 1 and FIG. 2, in a double-sided friction stir welding method, a double-sided friction stir welding apparatus including a pair of rotating tools 1 and 8, a holding device (not illustrated), and a control device (not illustrated) that controls the operations of rotating tools 1 and 8 is used. The control device controls, for example, an inclination angle α of each of the rotating tools 1 and 8, the distance between an end portion of the rotating tool 1 and an end portion of the rotating tool 8, the welding speed, the rotational speed of each of the rotating tools 1 and 8, and so forth.

The rotating tools 1 and 8 of the double-sided friction stir welding apparatus (the rotating tool that is disposed on the front surface side of metal plates will hereinafter sometimes be referred to as a front-surface-side rotating tool 1, and the rotating tool that is disposed on the rear surface side of the metal plates will hereinafter sometimes be referred to as a rear-surface-side rotating tool 8) are arranged such that one of them is located on the side on which first surfaces (front surfaces) of metal plates (workpieces, or to-be-welded members) 4 are present and the other is located on the side on which second surfaces (rear surfaces) of the metal plates 4 are present. The two metal plates 4 are arranged so as to be parallel to a joint center line 7 that is illustrated in FIG. 1 and FIG. 2 and are each held by a holding device (not illustrated). On an unwelded portion of the two metal plates 4 that is located on the joint center line 7, the rotating tools 1 and 8 move in a welding direction (a direction indicated by an arrow in each of the drawings) while rotating and pressing the metal plates 4. As a result, the metal plates 4 are softened by frictional heat generated between the rotating tools 1 and 8 and the metal plates 4, and the softened portions of the metal plates 4 are stirred by the rotating tools 1 and 8 in such a manner as to generate plastic flow, so that the metal plates 4 are welded together. Note that, in the following description, a portion in which the metal plates 4 have been welded together will be referred to as a welded portion 5.

As illustrated in FIG. 1 and FIG. 2, when viewed from the front surface side (or the rear surface side) of the metal plates 4, it is preferable that the rotating tool 1 on the front surface side and the rotating tool 8 on the rear surface side, which oppose each other, rotate in opposite directions. This enables a rotation torque that is applied by the rotating tool 1 to the metal plates 4 and a rotation torque that is applied by the rotating tool 8 to the metal plates 4 to cancel each other out. As a result, compared with the case of a friction stir welding method of the related art in which an unwelded portion is pressed and welded by using only one rotating tool disposed on one surface side, the structure of a jig that restrains a to-be-welded member can be further simplified. In the cases illustrated in FIG. 1 and FIG. 2, the direction of rotation of the front-surface-side rotating tool 1 is indicated by arrow $T_s$, and the direction of rotation of the rear-surface-side rotating tool 8 is indicated by arrow $T_b$.

Note that, if the rotating tool 1 on the front surface side and the rotating tool 8 on the rear surface side, which opposes each other, rotate in the same direction, the speed of one of the rotating tools relative to the other of the rotating tools approaches zero. As a result, plastic deformation of the metal plates 4 becomes smaller as the plastic flow of the metal plates 4 becomes close to a uniform state, and heat generated by plastic deformation of the material cannot be obtained, so that it is difficult to achieve a favorable welded state. Thus, in order to uniformly obtain a temperature rise and a shearing stress that are sufficient to achieve a favorable welded state in a thickness direction of the metal plates, it is effective to set the directions of rotations of the rotating tool 1 on the front surface side (the first surface side) and the rotating tool 8 on the rear surface side (the second surface side), which oppose each other, to be opposite to each other.

Here, types of welding of metal plates will now be described.

Preferred examples of types of welding of metal plates include butt welding and lap welding. In butt welding, as illustrated in FIG. 1, in a state where the two metal plates 4 are placed end to end without overlapping, a butt-joint portion including the end surfaces (abutting surfaces) of the metal plates opposing each other, is pressed by the rotating tools 1 and 8, and the rotating tools 1 and 8 are caused to move in the welding direction while rotating, so that the metal plates are welded together. In lap welding, as illustrated in FIG. 2, an overlapping portion where end portions of the two metal plates 4 at least partially overlap each other is pressed by the rotating tools 1 and 8, and the rotating tools 1 and 8 are caused to move in the welding direction while rotating, so that the metal plates are welded together. Note that the difference between FIG. 1 and FIG. 2 is only the type of welding, and the configurations of the other devices and so forth are the same, and thus, a case of butt welding illustrated in FIG. 1 will be mainly described below.

The rotating tools for double-sided friction stir welding according to aspects of the present invention will now be described.

Figure 4:
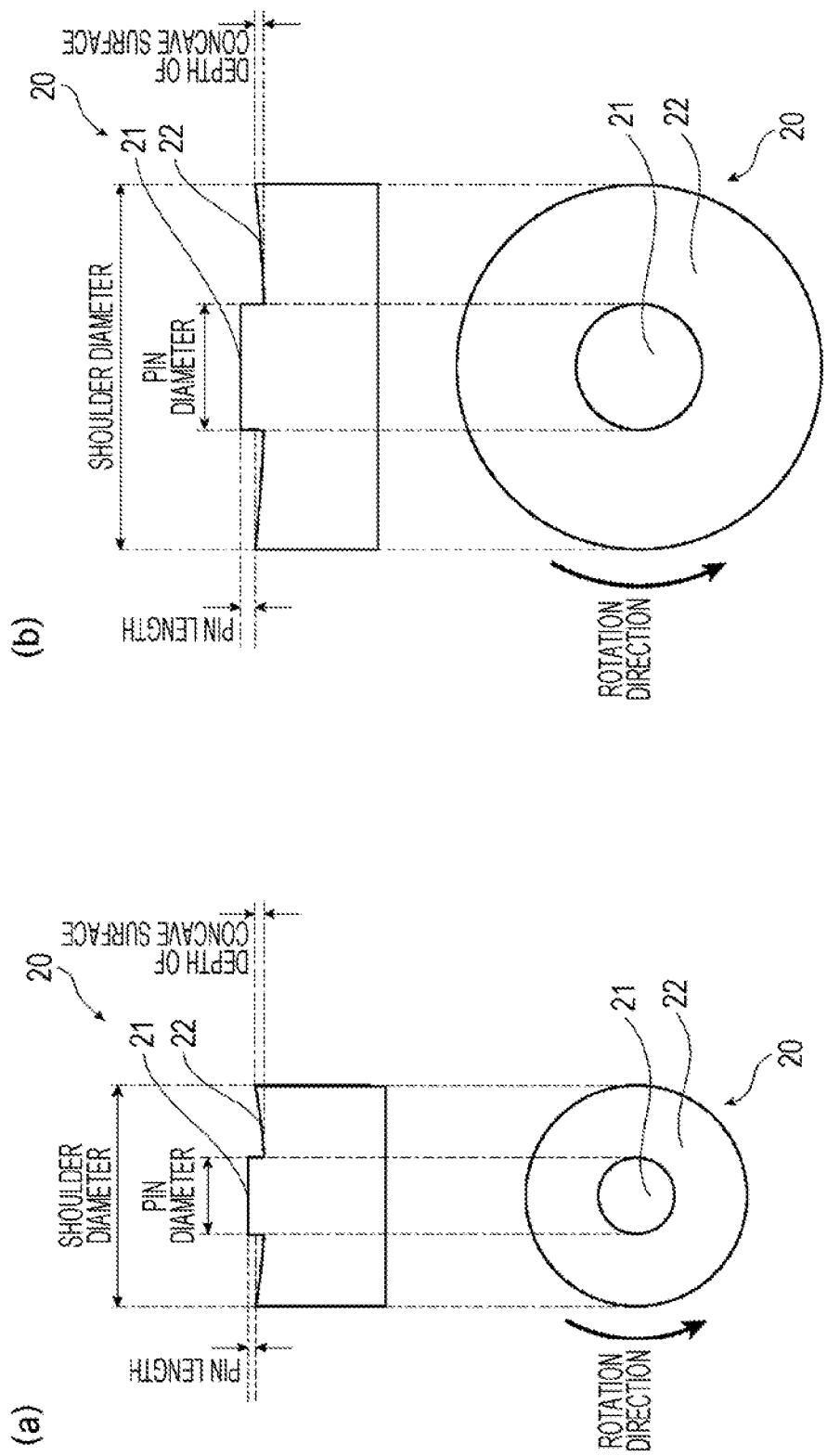
FIG. 4(a) and FIG. 4(b) each illustrate the shape of a rotating tool of the related art and each have a side view in the upper part thereof and a plan view in the lower part thereof.
Figure 5:
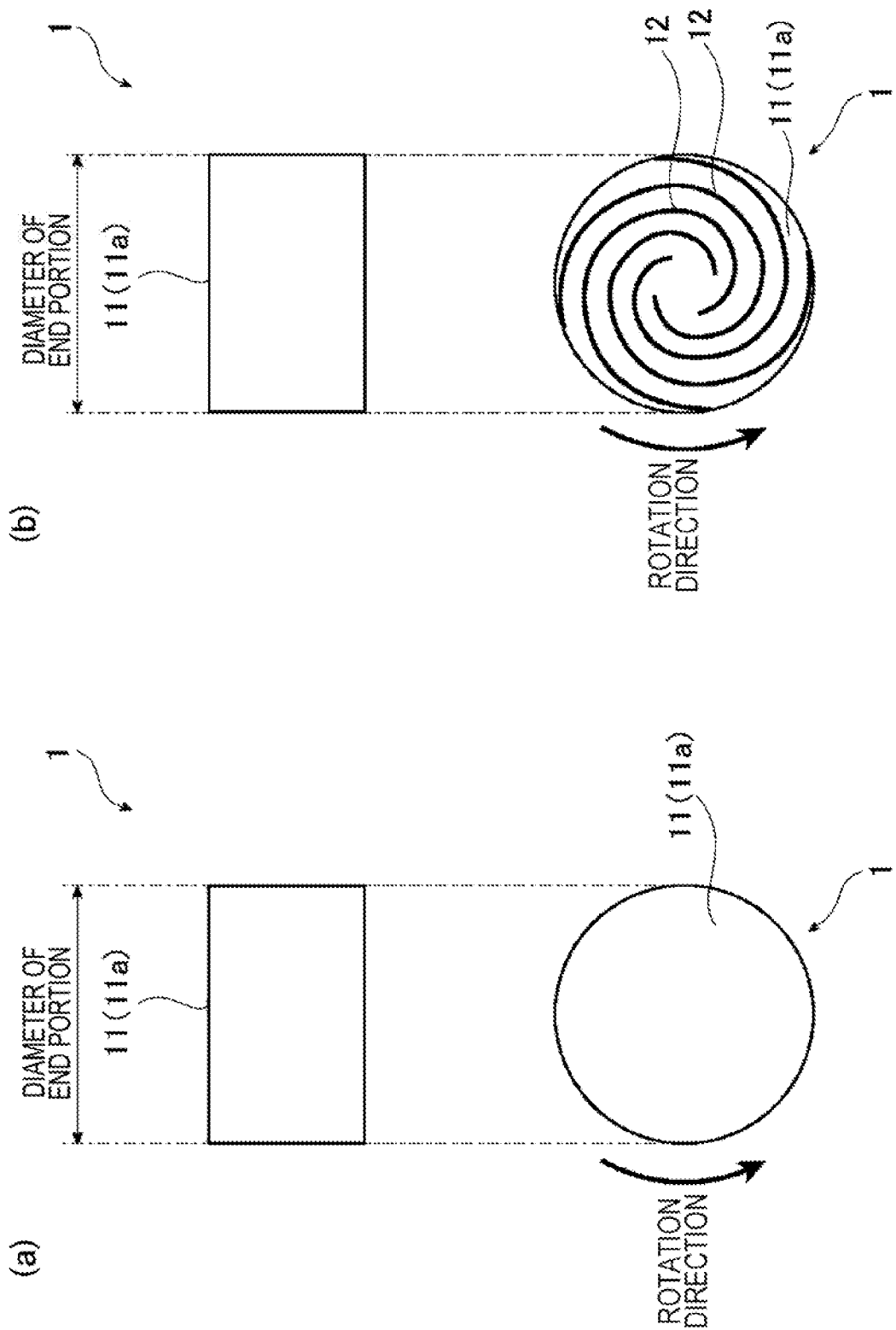
FIG. 5(a) and FIG. 5(b) each illustrate the shape of one of rotating tools for double-sided friction stir welding according to a first embodiment of the present invention and each have a side view in the upper part thereof and a plan view in the lower part thereof.
Figure 6:
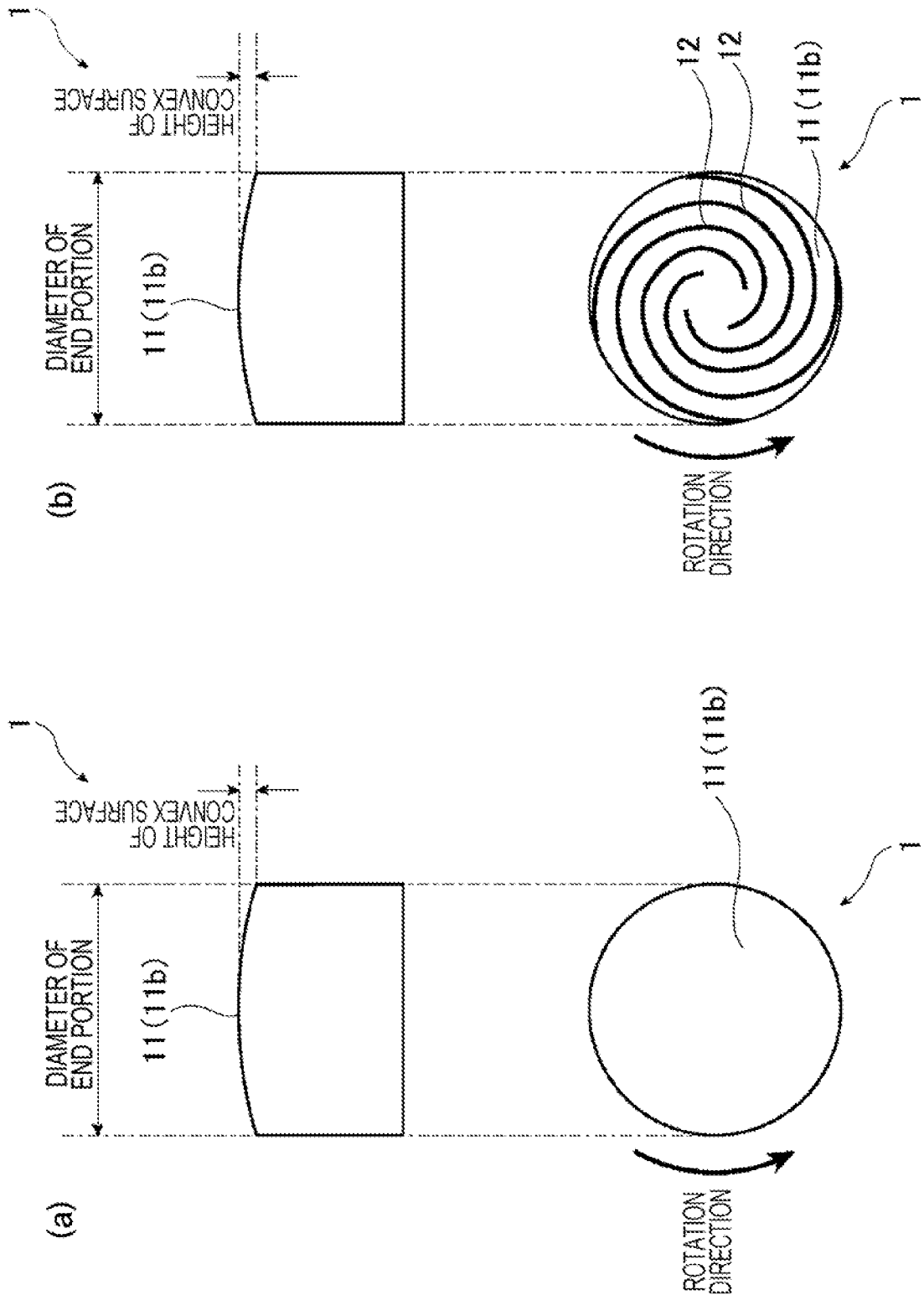
FIG. 6(a) and FIG. 6(b) each illustrate the shape of one of rotating tools for double-sided friction stir welding according to a second embodiment of the present invention and each have a side view in the upper part thereof and a plan view in the lower part thereof.
Figure 7:
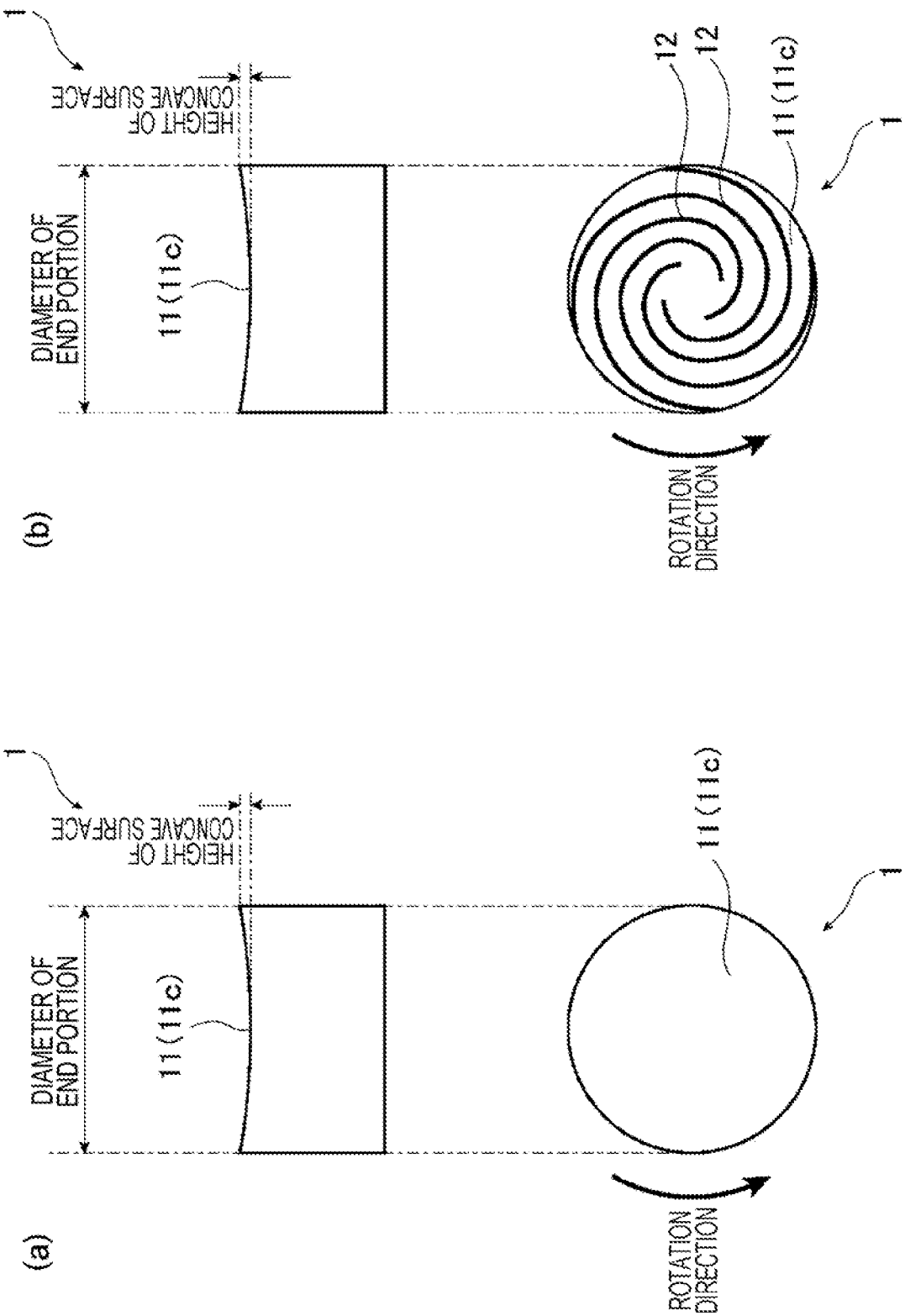
FIG. 7(a) and FIG. 7(b) each illustrate the shape of one of rotating tools for double-sided friction stir welding according to a third embodiment of the present invention and each have a side view in the upper part thereof and a plan view in the lower part thereof.

FIG. 4 is a diagram illustrating a rotating tool 20 of the related art that includes a probe. FIG. 5 to FIG. 8 are diagrams illustrating the rotating tools 1 and 8 in accordance with aspects of the present invention. FIG. 5 illustrates one of the rotating tools according to the first embodiment of the present invention. FIG. 6 illustrates one of the rotating tools according to the second embodiment of the present invention. FIG. 7 illustrates one of the rotating tools according to the third embodiment of the present invention. Note that FIG. 4 to FIG. 7 each has a side view in the upper part thereof and a plan view in the lower part thereof. The front-surface-side rotating tool 1 and the rear-surface-side rotating tool 8 have the same shape, and thus, only the front-surface-side rotating tool 1 is illustrated in FIG. 4 to FIG. 8.

The rotating tool 20 including a probe (a pin) 21, which is an example of the related art, will now be described with reference to FIG. 4. FIG. 4(a) and FIG. 4(b) each illustrate an example of the rotating tool 20 that includes the probe 21 formed on a shoulder portion 22. For example, in the case of the rotating tool 20 illustrated in FIG. 4(a), the rotating tool 20 is shaped as follows: the diameter of the shoulder portion 22 (shoulder diameter) is 12 mm, the diameter of the probe 21 (pin diameter) is 4 mm, the length of the probe 21 (pin length) is 0.5 mm, and the depth of a concave surface is 0.3 mm. In the case of the rotating tool 20 illustrated in FIG. 4(b), the rotating tool 20 is shaped as follows: the shoulder diameter is 20 mm, the pin diameter is 6.7 mm, the pin length is 0.7 mm and the depth of a concave surface is 0.3 mm.

As illustrated in FIG. 4(a) and FIG. 4(b), an end portion of the rotating tool 20 of the related art, that is, a portion of the rotating tool 20 that comes into contact with softened portions of metal plates during welding, includes the shoulder portion 22 (the area indicated by the shoulder diameter in FIG. 4(a) and FIG. 4(b)) and the probe 21 (the area indicated by the pin diameter in FIG. 4(a) and FIG. 4(b)).

The shoulder portion 22 has a flat shape formed of a substantially planar surface or a gently curved surface. The probe 21 has a shape that is discontinuous to the shoulder portion 22 and has a shape protruding substantially vertically toward the metal plates (not illustrated).

The probe 21 has a function of improving a stirring performance in the vicinity of center portions of the metal plates in a plate-thickness direction by entering softened portions of the metal plates further toward the center in the plate-thickness direction during welding. On the other hand, there is a problem in that the probe 21 that is positioned further forward in the plate-thickness direction (toward the center of the plate-thickness) receives a stress greater than the stress received by the shoulder portion 22. Consequently, there is another problem in that repair is required due to the above-mentioned breakage and wear of a rotating tool.

As a result of extensive studies, the inventors of the present invention have developed rotating tools for double-sided friction stir welding that are capable of suppressing occurrence of a defect in a welded portion and increasing a welding speed without having a probe that is especially likely to break or become worn by nature due to a greater stress applied thereto.

As illustrated in FIG. 5 to FIG. 7, an end of each of the rotating tools 1 and 8 for double-sided friction stir welding according to aspects of the present invention (the rotating tools 1 and 8 opposing each other) is formed of simply an end portion 11. Unlike the configuration of the rotating tool of the related art, which is illustrated in FIG. 4, the end portion 11 of each of the rotating tools according to aspects of the present invention does not include the probe 21. The end portion 11 of each of the rotating tools 1 and 8 is formed in any one type of a planar shape 11a (see FIG. 5), a convex curved shape 11b (see FIG. 6), and a concave curved shape 11c (see FIG. 7). In addition, each of the end portions 11 is formed to have a circular cross section.

Here, the end portions 11 of the rotating tools 1 and 8 (an end portion 2 of the front-surface-side rotating tool and an end portion 9 of the rear-surface-side rotating tool, which are illustrated in FIG. 1 and so forth) are portions that come into contact with the metal plates 4 and with flowing portions (softened portions) of the metal plates 4 during welding. Thus, the end portions 11 of the rotating tools 1 and 8 are made of a material harder than the metal plates 4 in a high-temperature environment to which the end portions 11 are exposed during welding. Accordingly, during welding, the rotating tools 1 and 8 can deform the metal plates 4 while the shapes of the end portions 11 are maintained. As a result, a high stirring performance can be continuously obtained, and suitable welding can be performed.

Note that test methods for Vickers hardness at elevated temperatures may be used for hardness comparison. The rotating tools 1 and 8 may be formed such that only their end portions have the above-mentioned hardness or such that the entire rotating tools 1 and 8 have the above-mentioned hardness.

In accordance with aspects of the present invention, in addition to the above-described configuration, it is preferable that the end portion 11 of each of the rotating tools 1 and 8 has vortex-shaped (spiral-shaped) stepped portion 12. It is preferable that vortices (spirals) forming the stepped portions 12 of the rotating tool 1 be provided so as to extend in a direction opposite to the direction of rotation of the rotating tool 1, and it is preferable that vortices (spirals) forming the stepped portions 12 of the rotating tool 8 be provided so as to extend in a direction opposite to the direction of rotation of the rotating tool 8. It is preferable to provide one or more vortices forming the stepped portions 12. Note that if the number of vortices forming the stepped portions 12 is greater than six, an effect of improving material flow decreases, and in addition, there is a possibility that the end portions 11 of the rotating tools 1 and 8 may easily break as a result of their shapes becoming complex. Therefore, it is preferable that the number of vortices forming the stepped portions 12 be six or smaller. Note that, in the cases illustrated in FIG. 5(b), FIG. 6(b), and FIG. 7(b) and in the case illustrated in FIG. 8(a), four vortices are provided.

From the standpoint of preventing breakage of the end portions 11 of the rotating tools 1 and 8 while improving material flow, the number of vortices forming the stepped portions 12 can be adjusted in accordance with the diameter of each of the end portions 11. More specifically, it is preferable to increase the number of vortices as the diameter of each of the end portions 11 becomes larger, and it is preferable to decrease the number of vortices as the diameter of each of the end portions 11 becomes smaller.

Each of the stepped portions 12 has a shape that is recessed on the other surface (planar surface or curved surface) of a corresponding one of the end portions. By providing such recessed stepped portions 12, when the rotating tools 1 and 8 press and stir the metal plates 4, a metal material softened by frictional heat is caused to flow from the outside of the rotating tools 1 and 8 toward the inside, and the metal material can be suppressed from flowing out of the portion pressed by the rotating tools 1 and 8. This can facilitate plastic flow of the pressed portion. In addition, a decrease in the thickness of a welded portion in comparison with a base member can be suppressed, and a beautiful surface of the welded portion can be formed with no burr. Note that the above advantageous effects, which are obtained as a result of providing the stepped portions, are obtained by forming the vortex-shaped stepped portions 12 such that the stepped portions 12 extend in the direction opposite to the direction of rotation of the rotating tools 1 and 8. In other words, it is preferable that the end portions of the rotating tools according to aspects of the present invention do not have a vortex-shaped stepped portion, or it is preferable that the end portions of the rotating tools according to aspects of the present invention each have vortex-shaped stepped portions that are formed to extend in a direction opposite to the rotation direction of the corresponding rotating tool.

Note that, advantageous effects similar to those described above can be obtained by providing the vortex-shaped stepped portions 12, each of which is formed to extend in the direction opposite to the rotation direction of the corresponding rotating tool, in one or more tiers.

The stepped portions 12 will now be described more specifically with reference to FIG. 8. FIG. 8(a) is a plan view of the rotating tool (front-surface-side rotating tool) 1 that includes the end portion 11 having the convex curved shape 11b, and FIG. 8(b) and FIG. 8(c) are sectional views taken along line B-B' of FIG. 8(a).

As illustrated in FIG. 8(a), when viewed in plan view, each of the stepped portions 12 is formed to extend in the direction opposite to the rotation direction. In other words, the direction of the curve of each of the stepped portions 12 extending from the circumference of a circle toward the center of the circle is set to be opposite to the rotation direction of the rotation tool.

As illustrated in FIG. 8(a), when viewed in plan view, each of the vortex-shaped stepped portions 12 forms a curve extending from the vicinity of the center of the circle toward the circumference of the circle. It is preferable that the length of each vortex be 0.5 turns or more and 2 turns or less when the length of the outer periphery of the end portion 11 is one turn. The length of each vortex can also be adjusted in accordance with the diameter of the end portion 11, and it is preferable to increase the length of each vortex as the diameter of the end portion 11 becomes larger and to decrease the length of each vortex as the diameter of the end portion 11 becomes smaller.

Figure 8:
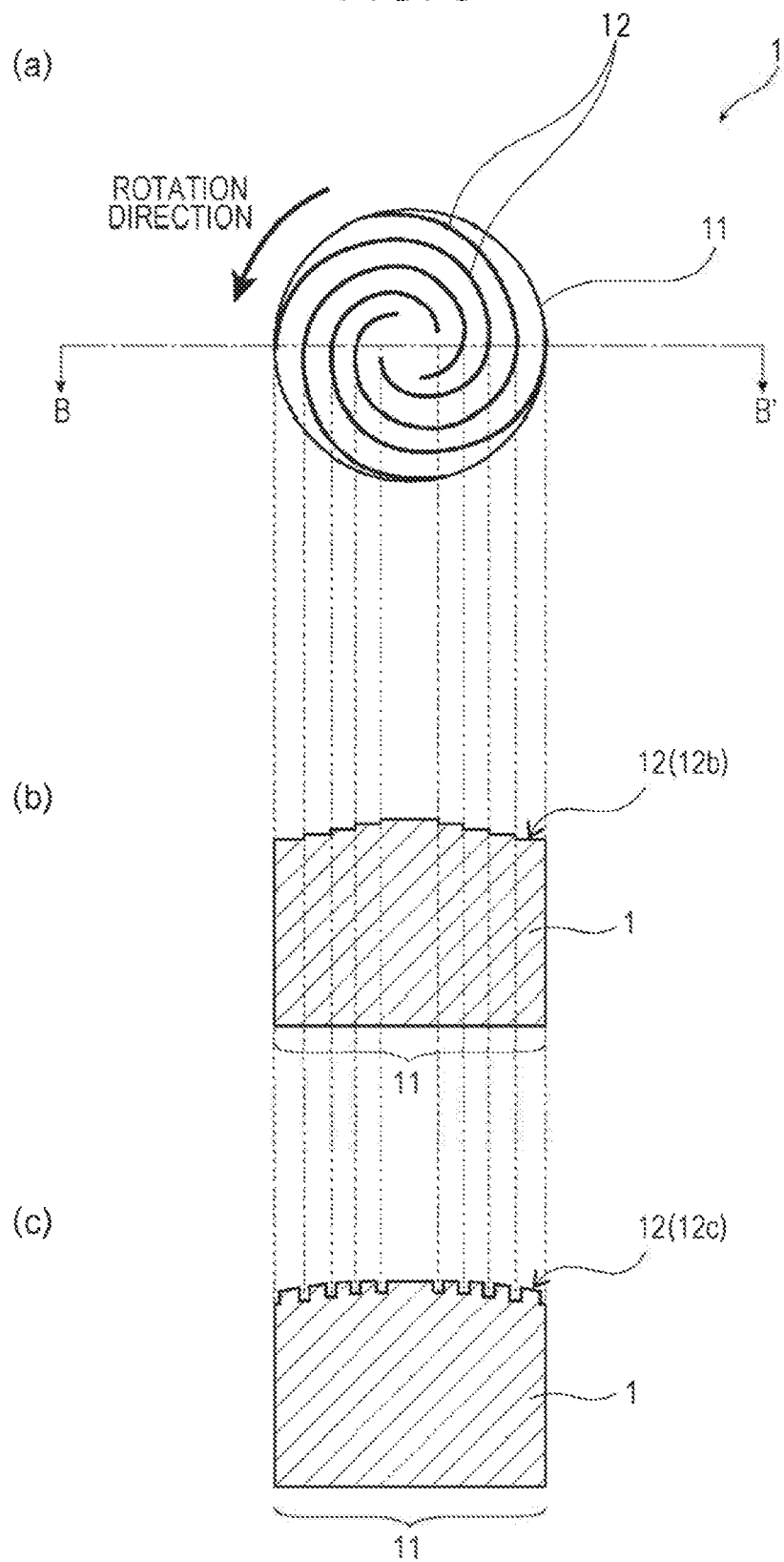
FIG. 8 illustrates shapes of convex stepped portions included in one of the rotating tools for double-sided friction stir welding according to aspects of the present invention.

Specific examples of the stepped portions 12 may be step portions 12b that are illustrated in FIG. 8(*b*) and groove portions 12c that are illustrated in FIG. 8(*c*). In the case illustrated in FIG. 8(*b*), similar to the convex curved surface of the end portion 11 of the rotating tool 1, the step portions 12b form substantially horizontal steps such that the heights of the steps gradually increase from the circumference of a circle toward the center of the circle. In accordance with aspects of the present invention, the vortex-shaped steps may be formed in one or more tiers from the standpoint of obtaining the above-described advantageous effects. In the case illustrated in FIG. 8(*b*), the formed stepped portions 12 each have a vortex-like shape when viewed in plan view as illustrated in FIG. 8(*a*).

Note that, although not illustrated, in the case of a rotating tool that includes an end portion having a concave curved shape, when the step portions 12b are each formed in the concave curved shape, steps may be formed along the concave curved shape such that the heights of the steps gradually decrease from the circumference of a circle toward the center of the circle.

In the case illustrated in FIG. 8(*c*), in the curved surface (convex curved surface) of the end portion 11 of the rotating tool 1, each of the groove portions 12c has a groove that is substantially U-shaped when viewed in cross section so as to be recessed on the other surface. In accordance with aspects of the present invention, one or more groove portions 12c may be formed from the standpoint of obtaining the above-described advantageous effects. In the case illustrated in FIG. 8(*c*), the formed groove portions 12c each have a long and narrow shape extending in a vortex-like manner when viewed in plan view as illustrated in FIG. 8(*a*).

Note that, although not illustrated, in the rotating tool 1 that includes the end portion 11 having the concave curved shape 11c or the planar shape 11a, also when the groove portions 12c are formed in the concave curved surface or the planar surface, grooves each of which is substantially U-shaped when viewed in cross section may be formed.

In accordance with aspects of the present invention, in addition to the above-described configuration, it is preferable that a diameter D (mm) of the end portion 11 of each of the rotating tools 1 and 8 satisfy the following relational formula (3):

$$4 \times t \le D \le 20 \times t \quad \text{formula (3)}$$

where t stands for thickness of each metal plate (mm).

By controlling the diameter of each of the end portions 11, the rotating tools 1 and 8 can provide a temperature rise and a shearing stress uniformly and effectively in the plate-thickness direction of the metal plate 4. It is preferable that the diameter D of the end portion 11 of the rotating tool 1 be controlled in accordance with the thickness of each of the metal plates 4 (the total thickness of the metal plates 4 in the case of lap welding). In other words, it is effective to set the diameter D (mm) of the end portion 11 of each of the rotating tools 1 and 8 in accordance with the above formula (3): $4 \times t \le D \le 20 \times t$.

If the diameter D (mm) is less than $4 \times t$ (mm), uniform plastic flow in the plate-thickness direction may sometimes not be effectively obtained. In contrast, in the case where the diameter D (mm) is greater than $20 \times t$ (mm), a region in which plastic flow is generated is unnecessarily widened, and an excessive load is applied to the apparatus. Therefore, this case is not preferable.

The rotating tools according to the first to third embodiments of the present invention will be described in detail below. Note that only the front-surface-side rotating tool 1 is illustrated in FIG. 5 to FIG. 7.

First Embodiment

As illustrated in FIG. 5(*a*) and FIG. 5(*b*), each of the rotating tools 1 and 8 according to the first embodiment of the present invention ends with circular peripheries, and each of these ends is formed of simply the end portion 11 having the planar shape 11a. Each of the end portions 11 formed in the planar shape has an end surface that comes into contact with the metal plates and that is formed of a single planar surface perpendicular to the rotation axis of a corresponding one of the rotating tools 1 and 8. Unlike a rotating tool of the related art, each of the end surfaces does not have a probe protruding toward the metal plates. In addition, as illustrated in FIG. 5(*b*), in each of the rotating tools 1 and 8, the above-mentioned vortex-shaped (spiral-shaped) stepped portions 12, which extend in the direction opposite to the rotation direction, can be formed in one or more tiers in the end portion 11. Note that the step portions 12b or the groove portions 12c, which have been described above, are formed as the stepped portions 12.

Second Embodiment

As illustrated in FIGS. 6(*a*) and 6(*b*), the rotating tools 1 and 8 of the second embodiment have circular ends each of which is formed of only the end portion 11 having the convex curved shape 11b, and these ends of the rotating tools are convexed. Although a rotating tool of the related art includes a probe protruding toward metal plates and has a discontinuous shape formed of a shoulder portion and the probe, each of the end portions 11 having the convex curved shape has a continuous shape without having a probe and forms an approximately uniform inclined surface. In other words, each of the end portions 1 having the convex curved shape has an end surface that comes into contact with the metal plates and that is formed of a single curved surface (a parabolic surface, a prolate surface, or a spherical surface) being convexed in the direction toward the center, and the end surface forms a curve having an approximately uniform radius of curvature in a cross-sectional shape including the rotation axis in a direction vertical to the metal plates. In addition, as illustrated in FIG. 6(*b*), in each of the rotating tools 1 and 8, the above-mentioned vortex-shaped (spiral-shaped) stepped portions 12, which extend in the direction opposite to the rotation direction, can be formed in one or more tiers in the end portion 11. Note that the step portions 12b or the groove portions 12c, which have been described above, are formed as the stepped portions 12.

In addition, in the case where the end of each of the rotating tools 1 and 8 is formed of the end portion 11 having the convex curved shape 11b, when the convex curved surface (convex surface) has a height dv (mm), and the end portion of the rotating tool has the diameter D (mm), it is preferable that the rotating tool satisfy the following relational formula (4).

$$dv/D \le 0.06 \quad \text{formula (4)}$$

When the end portions come into contact with the metal plates within a range in which the above formula (4) is satisfied (i.e., the value of dv/D is 0.06 or smaller), pressure can be effectively applied to the flowing portions. As a result, plastic flow that is sufficient for welding can be generated by rotations of the rotating tools. In contrast, in the case of exceeding the range of the above formula (4) (i.e., the value of dv/D exceeds 0.06), the front and rear surfaces of the welded portion become notably recessed, and the thickness of the welded portion becomes notably small with respect to the thickness of each of the metal plates, so that it may sometimes be difficult to ensure the joint strength. Therefore, this case is not desirable. Note that, in order to effectively apply pressure to the flowing portions, it is preferable to set a lower limit of the value of dv/D to 0.01 or larger.

Third Embodiment

As illustrated in FIGS. 7(a) and 7(b), the rotating tools 1 and 8 of the third embodiment have circular ends each of which is formed of simply the end portion 11 having the concave curved shape 11c, and these ends of the rotating tools are concaved. Although a rotating tool of the related art includes a probe protruding toward metal plates and has a discontinuous shape formed of a shoulder portion and the probe, each of the end portions 11 having the concave curved shape has a continuous shape without having a probe and forms an approximately uniform inclined surface. In other words, each of the end portions 1 having the concave curved shape has an end surface that comes into contact with the metal plates and that is formed of a single curved surface (a parabolic surface, a prolate surface, or a spherical surface) being concaved in the direction toward the center, and the end surface forms a curve having an approximately uniform radius of curvature in a cross-sectional shape including the rotation axis in the direction vertical to the metal plates. In addition, as illustrated in FIG. 7(b), in each of the rotating tools 1 and 8, the above-mentioned vortex-shaped (spiral-shaped) stepped portions 12, which extend in the direction opposite to the rotation direction, can be formed in one or more tiers in the end portion 11. Note that the step portions 12b or the groove portions 12c, which have been described above, are formed as the stepped portions 12.

In addition, in the case where the end of each of the rotating tools is formed of the end portion 11 having the concave curved shape, when the concave curved surface (concave surface) has a depth dc (mm), and the end portion of the rotating tool has the diameter D (mm), it is preferable that the rotating tool satisfy the following relational formula (5).

$$dc/D \leq 0.03 \qquad \text{formula (5)}$$

When the end portions come into contact with the metal plates within a range in which the above formula (5) is satisfied (i.e., the value of dc/D is 0.03 or smaller), the concave curved surfaces of the end portions are filled with the softened metal, so that pressure can be uniformly applied to the flowing portions. As a result, plastic flow that is sufficient for welding can be generated by rotation of the rotating tools. In contrast, in the case of exceeding the range of the above formula (5) (i.e., the value of dc/D exceeds 0.03), it becomes difficult to apply a uniform pressure to the above-mentioned flowing portions, and it may sometimes become difficult to ensure plastic flow sufficient for welding. Therefore, this case is not desirable. Note that, in order to apply a uniform pressure to the flowing portions, it is preferable to set a lower limit of the value of dc/D to 0.01 or larger.

Note that the shapes of base portions of the rotating tools 1 and 8, the base portions being opposite to the end portions of the rotating tools 1 and 8, are not particularly limited as long as the base portions can be attached to a double-sided friction stir welding apparatus that is known in the related art.

A preferred example of a double-sided friction stir welding method using the rotating tools 1 and 8 for double-sided friction stir welding according to aspects of the present invention will now be described.

In the double-sided friction stir welding method, by optimizing conditions of the following various parameters, more favorable advantageous effects related to improvement in the durability of the rotating tools, suppression of occurrence of a joint defect, and an increase in welding speed can be obtained.

(1) inclination angle of rotating tool α(°): 0≤α≤3     formula (1)

FIG. 3 is a diagram illustrating a region in which friction stirring is performed by using the rotating tools according to aspects of the present invention. FIG. 3(a) is a diagram illustrating a state where the rotating tools 1 and 8, which are disposed on the front and rear surfaces of the metal plates 4 such as those illustrated in FIG. 1, are moved in the welding direction when viewed in plan view from the front surfaces of the metal plates 4. FIG. 3(b) is a sectional view taken along line A-A' of FIG. 3(a).

As illustrated in FIG. 3(b), it is preferable to perform welding in a state where the rotation axes of the rotating tools 1 and 8 (a rotation axis 3 of the front-surface-side rotating tool and a rotation axis 10 of the rear-surface-side rotating tool) are each inclined backward in the welding direction at an angle α° with respect to a vertical line 6, which extends in the direction vertical to the metal plates 4. In other words, it is preferable that the rotating tools 1 and 8 be inclined in such a manner that the leading ends of the rotating tools 1 and 8 are positioned further forward than the trailing ends of the rotating tools 1 and 8 are in the welding direction. As a result, a load that is otherwise applied to the rotating tools 1 and 8 in the horizontal direction (a bending direction) during welding can be dispersed to components of force that compress the rotating tools 1 and 8 in the axial directions of the rotating tools 1 and 8.

The rotating tools 1 and 8 need to be made of a material that is harder than the metal plates 4, and for example, there is a case where a material having poor toughness such as a ceramic is used. In this case, when a force in the bending direction is applied to the rotating tools 1 and 8, there is a possibility that a stress will be locally concentrated, which in turn results in breakage of the rotating tools 1 and 8. In order to avoid such a situation, by arranging the rotating tools 1 and 8 in such a manner that their rotation axes 3 and 10 are each inclined at the predetermined angle (α°) as described above, components of the load applied to the rotating tools 1 and 8 can be received as forces that compress the rotating tools 1 and 8 in the corresponding axial directions, and the forces in the bending direction can be reduced. As a result, the durability of each of the rotating tools 1 and 8 can be further improved.

The above-mentioned advantageous effects are obtained when the inclination angle α is 0 degrees or greater, and when the inclination angle α exceeds 3°, the front and rear surfaces of the welded portion may become recessed, and this may sometimes adversely affect the joint strength. Thus, it is preferable to set the inclination angle of the rotation axis of each of the rotating tools 1 and 8 to be $0 \leq \alpha \leq 3$.

(2) distance G(mm) between end portions of pair of rotating tools 1 and 8:$0.25 \times t - 0.2 \times D \times \sin \alpha \leq G \leq 0.8 \times t - 0.2 \times D \times \sin \alpha$   formula (2)

where t stands for thickness (mm) of unwelded portion of metal plates 4, D stands for diameter (mm) of end portions of rotating tools 1 and 8, and α stands for inclination angle (°) of rotating tools 1 and 8.

In double-sided friction stir welding, when achieving uniform provision of a sufficient temperature rise and a sufficient shearing stress in the plate-thickness direction during welding, it is important to manage the distance G between the end portions of the rotating tools 1 and 8 opposing each other. More specifically, it is preferable to manage (adjust) the above-mentioned distance G between the end portions of the rotating tools 1 and 8 to be within the range of the above formula (2) by using the thickness t of the unwelded portion of the metal plates 4, the diameter D of the end portion of each of the rotating tools 1 and 8, and the inclination angle α of each of the rotating tools 1 and 8.

Note that, in the case where butt welding, which is illustrated in FIG. 1, is performed, the thickness of one of the metal plates 4 may be set as the thickness t of the unwelded portion of the metal plates 4. In the case where lap welding, which is illustrated in FIG. 2, is performed, the total thickness of the metal plates 4 overlapping each other may be set as the thickness t. The inclination angle α of each of the pair of rotating tools 1 and 8 may be the same angle. In addition, the diameter D of the end portion of each of the rotating tools 1 and 8 refers to a diameter (pin diameter) of the end portion 11 having the planar shape or one of the curved shapes (the concave curved shape and the convex curved surface), which are illustrated in FIG. 5 to FIG. 7, in a cross section including the corresponding rotation axis in the direction vertical to the metal plates.

In the case where the rotating tools 1 and 8 are not inclined (i.e., the inclination angle α of each of the rotating tools 1 and 8 is 0 degrees), the lower limit and the upper limit of the distance G between the end portions 2 and 9 of the rotating tools 1 and 8 may be respectively set to 0.25×t and 0.8×t.

In contrast, in the case where the rotating tools 1 and 8 are inclined (i.e., the inclination angle α of each of the rotating tools 1 and 8 is $0 \leq \alpha \leq 3$), or in the case where the diameter D of the end portion of each of the rotating tools 1 and 8 is increased in order to increase the contact area between the end portion of the rotating tool 1 and the front surfaces of the metal plates 4 and the contact area between the end portion of the rotating tool 8 and the rear surfaces of the metal plates 4, the distance G between the rotating tools 1 and 8 needs to be set smaller. In this case, as expressed by the above formula (2), the lower limit of G may be obtained by subtracting 0.2×D×sin α from 0.25×t, and the upper limit of G may be obtained by subtracting 0.2×D×sin α from 0.8×t.

As described above, by controlling the distance G between the end portions of the rotating tools 1 and 8 to be within the range of the above formula (2), the end portions of the rotating tools 1 and 8 opposing each other are pressed against the front and rear surfaces of the metal plates 4 with a sufficient load, and heat generation and plastic flow in the welded portion are sufficiently facilitated. As a result, plastic flow is facilitated uniformly in the plate-thickness direction, and a joint in a favorable state can be obtained. Note that, when the above-mentioned value of the distance G exceeds the upper limit in formula (2), the end portions of the rotating tools 1 and 8 cannot be pressed against the front and rear surfaces of the metal plates 4 (workpieces) with a sufficient load, and the above-mentioned advantageous effects may sometimes not be obtained. In contrast, when the above-mentioned value of the distance G falls below the lower limit in formula (2), the front and rear surfaces of the welded portion may become recessed, and this may sometimes adversely affect the joint strength.

As illustrated in FIG. 3(*b*), the above-mentioned distance G corresponds to the shortest length between the end surface of the rotating tool (front-surface-side rotating tool) 1 and the end surface of the rotating tool (rear-surface-side rotating tool) 8, which oppose each other, in the vertical direction.

Note that welding conditions other than those described above may be set in a conventional manner. For example, in the double-sided friction stir welding apparatus and the double-sided friction stir welding method according to aspects of the present invention, the rotational speed of each of the rotating tools 1 and 8 is preferably set to 100 to 5,000 r/min and more preferably set to 500 to 3,000 r/min. By setting the rotational speed to be within these ranges, deterioration in mechanical properties due to an excessive amount of heat input can be suppressed while a favorable surface profile is maintained. The welding speed is preferably set to 1,000 ram/min or higher and is more preferably increased to 2,000 mm/min or higher.

Regarding the to-be-welded members, although it is preferable that a welding target be a high-melting-point alloy such as a steel plate, the to-be-welded members are not limited to this case. In addition, a steel plate, which is a type of a metal plate, can be a preferred example of the to-be-welded members.

In the case where the to-be-welded members are steel plates, the types of steels that can preferably be used include common structural steel and carbon steel, examples of which are rolled steels for welded structure of Japanese industrial standards (JIS) G 3106 and carbon steels for machine structural use of JIS G 4051. In addition, it can be favorably applied to high-strength structural steel that has a tensile strength of 800 MPa or greater. Even in this case, in the welded portion, a strength that is 85% or more, preferably 90% or more, and more preferably 95% or more of the tensile strength of a steel plate (a base member) can be obtained.

Double-sided friction stir welding is performed by using a double-sided friction stir welding apparatus that includes the pair of rotating tools 1 and 8 according to aspects of the present invention, such as those illustrated in FIG. 1 and so forth, a holding device (not illustrated), and a control device (not illustrated) that controls the rotating tools. For example, the control device controls the inclination angle of each of the rotating tools 1 and 8, the distance between the end portions of the rotating tools, the welding speed, the rotational speed of each of the rotating tools, and so forth in such a manner as to satisfy the welding conditions of the above formulas (1) and (2).

As described above, according to the rotating tools 1 and 8 according to aspects of the present invention, the durability of each of the rotating tools 1 and 8 can be improved. In addition, by forming the end portions of the rotating tools into the above-mentioned shapes and causing the rotating tools 1 and 8 opposing each other to rotate in the opposite directions, a sufficient temperature rise and a sufficient shearing stress can be given to the metal plates during welding. As a result, the effect that the occurrence of a defect in a welded portion can be suppressed, and the welding speed can be increased. Therefore, by performing the double-sided friction stir welding method using the double-sided friction stir welding apparatus that includes the rotating tools according to aspects of the present invention, the double-sided friction stir welding can be practically applied to welding of structural steel.

EXAMPLE

Operations and effects according to aspects of the present invention will be described below by using an example. Note that the present invention is not limited to the following example.

Double-sided friction stir welding was performed by using steel plates whose plate thickness, chemical composition, tensile strength, and Vickers hardness are shown in Table 1. In the example, lap welding was performed on some of the steel plates, and butt welding was performed on the rest of the steel plates.

In the case of butt welding, two steel plates of the same type were arranged side by side, and butt-joint surfaces forming a so-called square groove, which is not angled, and having a surface condition equivalent to that of a surface machined by a milling machine were formed. After that, welding was performed by pressing the rotating tools against both the first and second surfaces (the front surface and the rear surface) of a butt-joint portion and moving the rotating tools in the welding direction.

In the case of lap welding, two steel plates of the same type were arranged so as to overlap each other, and welding was performed by pressing the rotating tools against both the first and second surfaces (the front surface and the rear surface) of a steel-plate overlapping portion while a single welding length was set to 0.5 m.

Note that, both in the case of butt welding and in the case of lap welding, the pair of rotating tools were caused to rotate in the opposite directions during welding. In other words, the tools rotate in the same direction when the end portion of each of the tools is viewed from the front. Table 2-1 and Table 2-2 show welding conditions for friction stir welding. In addition, here, eight types of rotating tools having the cross-sectional dimensions and the shapes illustrated in FIG. 4 to FIG. 7 were used. Each of the rotating tools, which were used, is made of tungsten carbide (WC) having a Vickers hardness of 1,090. The rotating tools that are illustrated in FIG. 5(a) to FIG. 7(a), each of which does not have a probe or a vortex-shaped stepped portion, were used in examples of the invention. In addition, in the case of using the rotating tools that are illustrated in FIG. 5(b), FIG. 6(b), and FIG. 7(b), each of which does not have a probe but has vortex-shaped stepped portions, since the direction of the vortices shown is the clockwise direction, the rotation direction of each of the rotating tools was set to the counterclockwise direction in examples of the invention, and the rotation direction of each of the rotating tools was set to the clockwise direction in comparative examples. The rotating tools that are illustrated in FIGS. 4(a) and 4(b), each of which has a probe, were used in other comparative examples.

TABLE 1

| Number | Plate thickness (mm) | Chemical composition (% by mass) | | | | | Tensile strength (MPa) | Vickers hardness |
| --- | --- | --- | --- | --- | --- | --- | --- | --- |
| | | C | Si | Mn | P | S | | |
| 1 | 1.6 | 0.3 | 0.21 | 0.69 | 0.012 | 0.003 | 1010 | 337 |
| 2 | 2.4 | 0.16 | 0.07 | 0.69 | 0.016 | 0.009 | 425 | 142 |
| 3 | 1.2 | 0.3 | 0.21 | 0.69 | 0.012 | 0.003 | 1012 | 339 |

TABLE 2-1

| | Sample steel plate | Thickness of sample steel plate (mm) | Type of joint | Shape | Front and rear surface side welding tools | | | | |
| --- | --- | --- | --- | --- | --- | --- | --- | --- | --- |
| | | | | | Vickers hardness of tool material | Diameter D of end portions of front and rear surface side rotating tools (mm) | Height dv of convex surfaces of front and rear surface side rotating tools (mm) | Depth dc of concave surfaces of front and rear surface side rotating tools (mm) | dv/D |
| Invention example 1 | 1 | 1.6 | Butt | Tool without pin, End having concave surface Vortex-shaped steps (clockwise direction) [FIG. 7(b)] | 1090 | 8 | — | 0.2 | — |
| Invention example 2 | 1 | 1.6 | Butt | Tool without pin, End having concave surface Vortex-shaped steps (clockwise direction) [FIG. 7(b)] | 1090 | 13 | — | 0.3 | — |
| Invention example 3 | 1 | 1.6 | Butt | Tool without pin, End having concave surface Vortex-shaped steps (clockwise direction) [FIG. 7(b)] | 1090 | 30 | — | 0.3 | — |
| Invention example 4 | 1 | 1.6 | Butt | Tool without pin, End having concave surface No vortex-shaped step [FIG. 7(a)] | 1090 | 8 | — | 0.2 | — |
| Invention example 5 | 1 | 1.6 | Butt | Tool without pin, End having concave surface No vortex-shaped step [FIG. 7(a)] | 1090 | 13 | — | 0.3 | — |
| Invention example 6 | 1 | 1.6 | Butt | Tool without pin, End having concave surface | 1090 | 30 | — | 0.3 | — |

TABLE 2-1-continued

| Example | | | | | | | | | |
|---|---|---|---|---|---|---|---|---|---|
| Invention example 7 | 2 | 2.4 | Butt | No vortex-shaped step [FIG. 7(a)] Tool without pin, End having flat surface | 1090 | 13 | — | — | — |
| Invention example 8 | 2 | 2.4 | Butt | Vortex-shaped steps (clockwise direction) [FIG. 5(b)] Tool without pin, End having flat surface | 1090 | 20 | — | — | — |
| Invention example 9 | 2 | 2.4 | Butt | Vortex-shaped steps (clockwise direction) [FIG. 5(b)] Tool without pin, End having flat surface | 1090 | 40 | — | — | — |
| Invention example 10 | 1 | 1.6 | Butt | Vortex-shaped steps (clockwise direction) [FIG. 5(b)] Tool without pin, End having flat surface No vortex-shaped step [FIG. 5(a)] | 1090 | 8 | — | — | — |
| Invention example 11 | 1 | 1.6 | Butt | Tool without pin, End having flat surface No vortex-shaped step [FIG. 5(a)] | 1090 | 13 | — | — | — |
| Invention example 12 | 1 | 1.6 | Butt | Tool without pin, End having flat surface No vortex-shaped step [FIG. 5(a)] | 1090 | 30 | — | — | — |
| Invention example 13 | 1 | 1.6 | Butt | Tool without pin, End having convex surface Vortex-shaped steps (clockwise direction) [FIG. 6(b)] | 1090 | 8 | 0.4 | — | 0.050 |
| Invention example 14 | 1 | 1.6 | Butt | Tool without pin, End having convex surface Vortex-shaped steps (clockwise direction) [FIG. 6(b)] | 1090 | 13 | 0.5 | — | 0.038 |
| Invention example 15 | 1 | 1.6 | Butt | Tool without pin, End having convex surface Vortex-shaped steps (clockwise direction) [FIG. 6(b)] | 1090 | 30 | 0.5 | — | 0.017 |
| Invention example 16 | 2 | 2.4 | Butt | Tool without pin, End having convex surface No vortex-shaped step [FIG. 6(a)] | 1090 | 13 | 0.5 | — | 0.038 |
| Invention example 17 | 2 | 2.4 | Butt | Tool without pin, End having convex surface No vortex-shaped step [FIG. 6(a)] | 1090 | 20 | 0.5 | — | 0.025 |
| Invention example 18 | 2 | 2.4 | Butt | Tool without pin, End having convex surface No vortex-shaped step [FIG. 6(a)] | 1090 | 40 | 0.5 | — | 0.013 |
| Invention example 19 | 1 | 1.6 | Butt | Tool without pin, End having concave surface Vortex-shaped steps (clockwise direction) [FIG. 7(b)] | 1090 | 12 | — | 0.4 | — |
| Invention example 20 | 1 | 1.6 | Butt | Tool without pin, End having flat surface Vortex-shaped steps (clockwise direction) [FIG. 5(b)] | 1090 | 6 | — | — | — |

TABLE 2-1-continued

| | Front and rear surface side welding tools | | Arrangement of rotating tool | | Rotation direction of each rotating tool when end surface side portion of rotating tool is viewed from front | Rotational speed of rotating tool RS | | Welding speed TS (m/min) |
|---|---|---|---|---|---|---|---|---|
| | dc/D | Condition of stepped portions | Inclination angle α of front and rear surface side rotating tools (°) | Gap G between shoulders of front and rear surface side rotating tools (mm) | | Front surface side (time/min) | Rear surface side (time/min) | |
| Invention example 1 | 0.025 | Step-shaped [FIG. 8-(b)] | 0 | 0.80 | Counterclockwise | 3000 | 3000 | 1.2 |
| Invention example 2 | 0.023 | Groove-shaped [FIG. 8-(c)] | 1.5 | 1.00 | Counterclockwise | 1300 | 1300 | 2.0 |
| Invention example 3 | 0.010 | Groove-shaped [FIG. 8-(c)] | 1.5 | 1.00 | Counterclockwise | 800 | 800 | 1.2 |
| Invention example 4 | 0.025 | — | 0 | 0.80 | Counterclockwise | 3000 | 3000 | 1.2 |
| Invention example 5 | 0.023 | — | 1.5 | 1.00 | Counterclockwise | 1300 | 1300 | 2.0 |
| Invention example 6 | 0.010 | — | 1.5 | 1.00 | Counterclockwise | 800 | 800 | 1.2 |
| Invention example 7 | — | Step-shaped [FIG. 8-(b)] | 0 | 1.40 | Counterclockwise | 3000 | 3000 | 1.0 |
| Invention example 8 | — | Groove-shaped [FIG. 8-(c)] | 1.5 | 1.40 | Counterclockwise | 2500 | 2500 | 1.5 |
| Invention example 9 | — | Groove-shaped [FIG. 8-(c)] | 1.5 | 1.40 | Counterclockwise | 1500 | 1500 | 1.0 |
| Invention example 10 | — | — | 0 | 0.80 | Counterclockwise | 3000 | 3000 | 1.0 |
| Invention example 11 | — | — | 1.5 | 1.00 | Counterclockwise | 1300 | 1300 | 1.5 |
| Invention example 12 | — | — | 1.5 | 1.00 | Counterclockwise | 800 | 800 | 1.0 |
| Invention example 13 | — | Groove-shaped [FIG. 8-(c)] | 0 | 0.60 | Counterclockwise | 3000 | 3000 | 1.2 |
| Invention example 14 | — | Step-shaped [FIG. 8-(b)] | 0 | 0.60 | Counterclockwise | 1300 | 1300 | 2.0 |
| Invention example 15 | — | Step-shaped [FIG. 8-(b)] | 0 | 0.60 | Counterclockwise | 800 | 800 | 1.2 |
| Invention example 16 | — | — | 0 | 1.40 | Counterclockwise | 3000 | 3000 | 1.0 |
| Invention example 17 | — | — | 0 | 1.40 | Counterclockwise | 2500 | 2500 | 1.2 |
| Invention example 18 | — | — | 0 | 1.40 | Counterclockwise | 1500 | 1500 | 1.0 |
| Invention example 19 | 0.033 | Step-shaped [FIG. 8-(b)] | 1.5 | 0.80 | Counterclockwise | 1300 | 1300 | 2.0 |
| Invention example 20 | — | Groove-shaped [FIG. 8-(c)] | 1.5 | 0.80 | Counterclockwise | 3000 | 3000 | 1.0 |

TABLE 2-2

| | Sample steel plate | Thickness of sample steel plate (mm) | Type of joint | Front and rear surface side welding tools | | | | | |
|---|---|---|---|---|---|---|---|---|---|
| | | | | Shape | Vickers hardness of tool material | Diameter D of end portions of front and rear surface side rotating tools (mm) | Height dv of convex surfaces of front and rear surface side rotating tools (mm) | Depth dc of concave surfaces of front and rear surface side rotating tools (mm) | dv/D | dc/D |
| Invention example 21 | 1 | 1.6 | Butt | Tool without pin, End having convex surface Vortex-shaped steps (clockwise direction) [FIG. 6(b)] | 1090 | 9 | 0.6 | — | 0.067 | — |
| Invention example 22 | 1 | 1.6 | Butt | Tool without pin, End having concave surface No vortex-shaped step [FIG. 7(a)] | 1090 | 12 | — | 0.4 | — | 0.033 |

TABLE 2-2-continued

| | | | | | | | | | | |
|---|---|---|---|---|---|---|---|---|---|---|
| Invention example 23 | 1 | 1.6 | Butt | Tool without pin, End having flat surface No vortex-shaped step [FIG. 5(a)] | 1090 | 6 | — | — | — | — |
| Invention example 24 | 1 | 1.6 | Butt | Tool without pin, End having convex surface No vortex-shaped step [FIG. 6(a)] | 1090 | 9 | 0.6 | — | 0.067 | — |
| Invention example 25 | 3 | 1.2 | Lap | Tool without pin, End having flat surface Vortex-shaped steps (clockwise direction) [FIG. 5(b)] | 1090 | 20 | — | — | — | — |
| Invention example 26 | 3 | 1.2 | Lap | Tool without pin, End having flat surface Vortex-shaped steps (clockwise direction) [FIG. 5(b)] | 1090 | 40 | — | — | — | — |
| Invention example 27 | 3 | 1.2 | Lap | Tool without pin, End having convex surface No vortex-shaped step [FIG. 6(a)] | 1090 | 13 | 0.5 | — | 0.038 | — |
| Comparative example 1 | 1 | 1.6 | Butt | Tool without pin, End having concave surface Vortex-shaped steps (clockwise direction) [FIG. 7(b)] | 1090 | 8 | — | 0.2 | — | 0.025 |
| Comparative example 2 | 2 | 2.4 | Butt | Tool without pin, End having flat surface Vortex-shaped steps (clockwise direction) [FIG. 5(b)] | 1090 | 13 | — | — | — | — |
| Comparative example 3 | 1 | 1.6 | Butt | Tool without pin, End having convex surface Vortex-shaped steps (clockwise direction) [FIG. 6(b)] | 1090 | 30 | 0.5 | — | 0.017 | — |
| Comparative example 4 | 3 | 1.2 | Lap | Tool without pin, End having flat surface Vortex-shaped steps (clockwise direction) [FIG. 5(b)] | 1090 | 20 | — | — | — | — |
| Comparative example 5 | 1 | 1.6 | Butt | Tool with pin, Shoulder diameter of 12 mm, Pin length of 0.5 mm [FIG. 4(a)] | 1090 | 13 | — | 0.3 | — | 0.023 |
| Comparative example 6 | 1 | 1.6 | Butt | Tool with pin, Shoulder diameter of 12 mm, Pin length of 0.5 mm [FIG. 4(a)] | 1090 | 13 | — | 0.3 | — | 0.023 |
| Comparative example 7 | 1 | 1.6 | Butt | Tool with pin, Shoulder diameter of 12 mm, Pin length of 0.5 mm [FIG. 4(a)] | 1090 | 13 | — | 0.3 | — | 0.023 |
| Comparative example 8 | 2 | 2.4 | Butt | Tool with pin, Shoulder diameter of 20 mm, Pin length of 0.7 mm [FIG. 4(b)] | 1090 | 20 | — | 0.3 | — | 0.015 |
| Comparative example 9 | 2 | 2.4 | Butt | Tool with pin, Shoulder diameter of 20 mm, Pin length of 0.7 mm [FIG. 4(b)] | 1090 | 20 | — | 0.3 | — | 0.015 |
| Comparative example 10 | 3 | 1.2 | Lap | Tool with pin, Shoulder diameter of 20 mm, Pin length of 0.7 mm [FIG. 4(b)] | 1090 | 20 | — | 0.3 | — | 0.015 |

TABLE 2-2-continued

| | Front and rear surface side welding tools Condition of stepped portions | Arrangement of rotating tool | | | Rotational speed of rotating tool RS | | |
|---|---|---|---|---|---|---|---|
| | | Inclination angle α of front and rear surface side rotating tools (°) | Gap G between shoulders of front and rear surface side rotating tools (mm) | Rotation direction of each rotating tool when end portion of rotating tool is viewed from front | Front surface side (time/min) | Rear surface side (time/min) | Welding speed TS (m/min) |
| Invention example 21 | Step-shaped [FIG. 8-(b)] | 0 | 0.80 | Counterclockwise | 3000 | 3000 | 1.0 |
| Invention example 22 | — | 1.5 | 0.80 | Counterclockwise | 1300 | 1300 | 2.0 |
| Invention example 23 | — | 1.5 | 0.80 | Counterclockwise | 3000 | 3000 | 1.0 |
| Invention example 24 | — | 0 | 0.80 | Counterclockwise | 3000 | 3000 | 1.0 |
| Invention example 25 | Groove-shaped [FIG. 8-(c)] | 1.5 | 1.40 | Counterclockwise | 2500 | 2500 | 1.5 |
| Invention example 26 | Groove-shaped [FIG. 8-(c)] | 1.5 | 1.40 | Counterclockwise | 1500 | 1500 | 1.0 |
| Invention example 27 | — | 0 | 1.40 | Counterclockwise | 3000 | 3000 | 1.0 |
| Comparative example 1 | Step-shaped [FIG. 8-(b)] | 0 | 0.80 | Clockwise | 3000 | 3000 | 1.2 |
| Comparative example 2 | Step-shaped [FIG. 8-(b)] | 0 | 1.40 | Clockwise | 3000 | 3000 | 1.0 |
| Comparative example 3 | Step-shaped [FIG. 8-(b)] | 0 | 0.60 | Clockwise | 800 | 800 | 1.2 |
| Comparative example 4 | Groove-shaped [FIG. 8-(c)] | 1.5 | 1.40 | Clockwise | 2500 | 2500 | 1.5 |
| Comparative example 5 | — | 0 | 1.30 | Counterclockwise | 800 | 800 | 1.0 |
| Comparative example 6 | — | 1.5 | 1.20 | Counterclockwise | 1300 | 1300 | 2.0 |
| Comparative example 7 | — | 3 | 1.30 | Counterclockwise | 800 | 800 | 1.0 |
| Comparative example 8 | — | 1.5 | 1.80 | Counterclockwise | 3000 | 3000 | 1.0 |
| Comparative example 9 | — | 0.0 | 2.00 | Counterclockwise | 1600 | 1600 | 1.0 |
| Comparative example 10 | — | 0.0 | 2.00 | Counterclockwise | 1600 | 1600 | 1.0 |

Evaluations were conducted in the following manner by using obtained welding joints.

(I) Existence or Nonexistence of Surface Defect when Appearance of Joint is Observed Observation was performed on portions of the obtained welding joints in each of which the welding speed was one of the values shown Table 2-1 and Table 2-2. Regarding the existence or nonexistence of a surface defect, it is visually determined whether there is a groove-shaped portion that is in an unwelded state due to insufficient plastic flow or whether a welded portion is formed in a recessed manner because the gap G between the shoulder portions of the welding tools is too narrow. When a groove-shaped portion in the unwelded state or a welded portion formed in a recessed manner was seen as a surface defect, a depth $D_d$ (mm) of the portion was measured by using a laser displacement meter and evaluated by using the following criteria.

<Criteria>

No: None of the above-mentioned surface defects are seen.

Acceptable: Although one of the above-mentioned surface defects is seen, the ratio ($D_d/t$) between the above-mentioned depth $D_d$ (mm) and the thickness t (mm) of each steel plate was 0.1 or smaller.

Yes: One of the above-mentioned surface defects was seen, and the ratio ($D_d/t$) between the above-mentioned depth $D_d$ (mm) and the thickness t (mm) of each steel plate exceeded 0.1. Alternatively, a groove-shaped portion in the unwelded state extended from the front surface to the rear surface. Note that, in the case where the groove-shaped portion in the unwelded state extended from the front surface to the rear surface, it is considered that the welding has failed, and evaluations of internal defect and joint strength are not conducted.

(II) Existence or Nonexistence of Internal Defect when Cross Section of Joint is Observed Observation was performed on portions of the obtained welding joints in each of which the welding speed was one of the values shown Table 2-1 and Table 2-2, and the portions were cross-sectionally cut at a position 20 mm from a welding starting end, a position 20 mm from a welding terminating end, and an intermediate position between these ends so as to be used as test specimens. Regarding the existence or nonexistence of an internal defect, whether an unwelded state formed in the welded portion due to insufficient plastic flow is seen was evaluated by using an optical microscope (magnification: 10 times) on the basis of the following criteria.

<Criteria>

No: An unwelded state having a tunnel-like shape is not seen at any of the three positions mentioned above.

Acceptable: An unwelded state formed in the welded portion was seen at one of the three positions mentioned above.

Yes: A portion in the unwelded state formed in the welded portion was seen at two or more of the three positions mentioned above.

Table 3 shows the results of (I) determination of the existence or nonexistence of a surface defect by observing the appearance of a joint when a welding operation was performed once with a welding length of 0.5 m and the results of (II) determination of the existence or nonexistence of an internal defect by observing the cross section of a joint. In addition, tensile test pieces each of which had the dimensions of a No. 1 test specimen defined by JIS Z 3121 were taken from the obtained welding joints, and Table 3 shows tensile strengths obtained when a tensile test (JIS Z 3121) was performed by using the test pieces.

It was confirmed from Table 3 that, in the butt joints of Invention Examples 1 to 24 and the lap joints of Invention Examples 25 to 27, even when the welding speed was increased to 1.0 m or higher, a strongly-welded state was obtained with no surface defect found by observation of the appearance of each joint and no internal defect found by observation of the cross section of each joint. In addition, the obtained joint strengths were each 95% or more of the tensile strength of the steel plates serving as base materials.

In contrast, in the butt joints of Comparative Examples 1 to 3, welding was performed by using rotating tools each of which does not have a probe and each of which has vortex-shaped stepped portions extending in the clockwise direction while the direction of rotation of each of the rotating tools was set to the clockwise direction. A surface defect and an internal defect were observed in the obtained joints, and a strongly-welded state was not obtained. In addition, the obtained joint strengths were each 70% or less of the tensile strength of the steel plates serving as base materials.

In the lap joint of Comparative Example 4, welding was performed by using rotating tools each of which does not have a probe and each of which has vortex-shaped stepped portions extending in the clockwise direction while the direction of rotation of each of the rotating tools was set to the clockwise direction. A surface defect and an internal defect were observed in the obtained joint, and a strongly-welded state was not obtained. In addition, the obtained joint strength was 70% or less of the tensile strength of the steel plates serving as base materials.

In the butt joints of Comparative Examples 5 to 9, rotating tools each having a pin were used on the condition that all of D (the diameter (mm) of the end portion of each rotating tool), a (the inclination angle)(° of each rotating tool), and G (the distance (mm) between the end portions of the pair of rotating tools) satisfied the above formulas (1), (2) and (3).

In the butt joints of Comparative Examples 5 to 9, although it was confirmed that, even when the welding speed was increased to 1.0 m or higher, a strongly-welded state was obtained with no surface defect found by observation of the appearance of each joint and no internal defect found by observation of the cross section of each joint, it was confirmed that the durability of each of the rotating tools was unfavorable.

In the lap joint of Comparative Example 10, although it was confirmed that, even when the welding speed was increased to 1.0 m or higher, a strongly-welded state was obtained with no surface defect found by observation of the appearance of the joint and no internal defect found by observation of the cross section of the joint, it was confirmed that the durability of each of the rotating tools was unfavorable.

TABLE 3

| | Existence of surface defect when appearance of joint was observed | Existence of internal defect when cross section of joint was observed | Tensile strength (MPa) |
|---|---|---|---|
| Invention example 1 | No | No | 1009 |
| Invention example 2 | No | No | 1012 |
| Invention example 3 | No | No | 1007 |
| Invention example 4 | No | No | 1005 |
| Invention example 5 | No | No | 1006 |
| Invention example 6 | No | No | 1001 |
| Invention example 7 | No | No | 430 |
| Invention example 8 | No | No | 433 |
| Invention example 9 | No | No | 432 |
| Invention example 10 | No | No | 1005 |
| Invention example 11 | No | No | 1002 |
| Invention example 12 | No | No | 1000 |
| Invention example 13 | No | No | 1012 |
| Invention example 14 | No | No | 1015 |
| Invention example 15 | No | No | 1007 |
| Invention example 16 | No | No | 430 |
| Invention example 17 | No | No | 433 |
| Invention example 18 | No | No | 432 |
| Invention example 19 | No | Acceptable | 990 |
| Invention example 20 | Acceptable | Acceptable | 999 |
| Invention example 21 | Acceptable | No | 995 |
| Invention example 22 | No | Acceptable | 980 |
| Invention example 23 | Acceptable | Acceptable | 987 |
| Invention example 24 | Acceptable | No | 983 |
| Invention example 25 | No | No | 1011 |
| Invention example 26 | No | No | 1006 |
| Invention example 27 | Acceptable | No | 1002 |
| Comparative example 1 | Yes (unwelded portion) | Yes | 587 |
| Comparative example 2 | Yes (unwelded portion) | Yes | 274 |
| Comparative example 3 | Yes (unwelded portion) | Yes | 487 |
| Comparative example 4 | Yes (unwelded portion) | Yes | 657 |
| Comparative example 5 | No | No | 1001 |
| Comparative example 6 | No | No | 1003 |
| Comparative example 7 | No | No | 997 |
| Comparative example 8 | No | No | 424 |
| Comparative example 9 | No | No | 422 |
| Comparative example 10 | No | No | 995 |

A welding operation with a welding length of 0.5 m was repeatedly performed, and Table 4 shows the number of times, out of the cumulative number of the welding operations, that a strong joint was obtained with a probability of 90% or more while no internal defect was found by observation of the cross section of the joint. As shown in Table 4, in the butt joints of Invention Examples 1 to 24 and the lap joints of Invention Examples 25 to 27, the number of the welding operations in which a strong joint was obtained with a probability of 90% or more was 13 or more.

In contrast, in the butt joints of Comparative Examples 1 to 3, the welding operation was performed by using rotating tools each of which does not have a probe and each of which has vortex-shaped stepped portions extending in the clockwise direction while the direction of rotation of each of the rotating tools was set to the clockwise direction. In Comparative Examples 1 to 3, the number of the welding operations in which a strong joint was obtained with a probability of 90% or more was zero.

In the lap joint of Comparative Example 4, the welding operation was performed by using rotating tools each of which does not have a probe and each of which has vortex-shaped stepped portions extending in the clockwise direction while the direction of rotation of each of the rotating tools was set to the clockwise direction. In Comparative Example 4, the number of the welding operations in which a strong joint was obtained with a probability of 90% or more was zero.

In the butt joints of Comparative Examples 5 to 9, the welding operation was performed by using rotating tools each having a pin, and the number of the welding operations in which a strong joint was obtained with a probability of 90% or more was 10 or less.

In the lap joint of Comparative Example 10, the welding operation was performed by using rotating tools each having a pin, and the number of the welding operations in which a strong joint was obtained with a probability of 90% or more was 10 or less.

As described above, it was revealed that, when welding was performed by using the rotating tools, each of which does not have a probe and each of which has vortex-shaped stepped portions extending in a direction the same as the rotation direction of the rotating tool, a defect occurred in the joint, or a problem occurred in the joint strength, and it was revealed that, when the rotating tools each having a pin were used, the durability of each of the rotating tools was unfavorable.

Experiments were conducted under the same conditions except for the existence or nonexistence of the vortex-shaped stepped portions in each pair of the above Invention Examples, that is, Invention Examples 1 and 4, Invention Examples 2 and 5, Invention Examples 3 and 6, Invention Examples 19 and 22, Invention Examples 20 and 23, and Invention Examples 21 and 24, and these experimental results shown in Table 3 have revealed that the use of rotating tools each of which has vortex-shaped stepped portions increased the weld strength of each joint.

In addition, the results obtained from Invention Examples 19 and 22 in which experiments were conducted under conditions that do not satisfy the following formula (5) have revealed that, when exceeding the range of the formula (5), although it is evaluated that there is no surface defect, it affects ensuring of plastic flow that is sufficient for welding, which may lead to occurrence of an internal defect. In other words, it is understood that, when rotating tools each having a concave surface further satisfy the condition of formula (5), occurrence of a surface defect and an internal defect can be more effectively suppressed, so that a joint having a sufficient strength can be obtained.

$$Dc/D \leq 0.03 \quad \text{Formula (5)}$$

In addition, the results obtained from Invention Examples 20 and 23 in which experiments were conducted under conditions that fall below the lower limit of the range of the following formula (3) have revealed that, when falling below the lower limit of the range of formula (3), although the evaluations of surface defect and internal defect are acceptable, such conditions affect ensuring of uniform plastic flow in the plate-thickness direction, which may lead to occurrence of a surface defect and an internal defect. In other words, it is understood that, when rotating tools each having a planar surface further satisfy the condition of formula (3), occurrence of a surface defect and an internal defect can be more effectively suppressed, so that a joint having a sufficient strength can be obtained.

$$4 \times t \leq D \leq 20 \times t \quad \text{formula (3)}$$

The results obtained from Invention Examples 21 and 24 in which experiments were conducted under conditions that do not satisfy formula (1) have revealed that, when exceeding the range of formula (4), although the evaluations of surface defect and internal defect are acceptable, such conditions affect the shape of the surface of a welded portion, which may lead to occurrence of a surface defect. In other words, it is understood that, when rotating tools each having a convex surface further satisfy the condition of formula (4), occurrence of a surface defect and an internal defect can be more effectively suppressed, so that a joint having a sufficient strength can be obtained.

$$dv/D \leq 0.06 \quad \text{formula (4)}$$

TABLE 4

|  | Number of times a strong joint was obtained with a probability of 90% or more |
|---|---|
| Invention example 1 | 16 |
| Invention example 2 | 18 |
| Invention example 3 | 21 |
| Invention example 4 | 15 |
| Invention example 5 | 15 |
| Invention example 6 | 19 |
| Invention example 7 | 13 |
| Invention example 8 | 14 |
| Invention example 9 | 17 |
| Invention example 10 | 16 |
| Invention example 11 | 15 |
| Invention example 12 | 20 |
| Invention example 13 | 18 |
| Invention example 14 | 21 |
| Invention example 15 | 24 |
| Invention example 16 | 15 |
| Invention example 17 | 16 |
| Invention example 18 | 17 |
| Invention example 19 | 16 |
| Invention example 20 | 15 |
| Invention example 21 | 23 |
| Invention example 22 | 14 |
| Invention example 23 | 14 |
| Invention example 24 | 18 |
| Invention example 25 | 15 |
| Invention example 26 | 16 |
| Invention example 27 | 15 |
| Comparative example 1 | 0 |
| Comparative example 2 | 0 |
| Comparative example 3 | 0 |
| Comparative example 4 | 0 |
| Comparative example 5 | 10 |
| Comparative example 6 | 8 |
| Comparative example 7 | 10 |
| Comparative example 8 | 7 |
| Comparative example 9 | 9 |
| Comparative example 10 | 8 |

REFERENCE SIGNS LIST 1 front-surface-side rotating tool
2 end portion of front-surface-side rotating tool
3 rotation axis of front-surface-side rotating tool
4 metal plate
5 welded portion
6 vertical line extending in direction vertical to metal plate
7 joint center line
8 rear-surface-side rotating tool 9 end portion of rear-surface-side rotating tool
10 rotation axis of rear-surface-side rotating tool
11 end portion
12 stepped portion
12b step portion
12c groove portion
G distance between end portions of rotating tools
α inclination angle of rotating tool
D diameter of end portion of rotating tool
t thickness of metal plate

The invention claimed is:

1. A pair of rotating tools for double-sided friction stir welding that are used in double-sided friction stir welding, which is a technique for welding metal plates by using a pair of rotating tools that are each disposed on one of first and second surfaces of an unwelded portion of the metal plates such that the rotating tools rotate in opposite directions, the pair of rotating tools comprising:
   end portions each of which is formed in a shape selected from the group consisting of (i) circular and convex curved, and (ii) circular and concave curved,
   the end portions each lacking a probe at an end thereof, and
   the end portions are each made of a material harder than the metal plates,
   wherein each of the end portions has a spiral-shaped stepped portion that is formed by distinct horizontal steps that extend in a direction opposite to a rotation direction, and
   wherein each of the end portions forms a curve having an approximately uniform radius of curvature in a cross-section including a rotation axis of a respective end portion, such that peripheral edges of the distinct horizontal steps are positioned along the curve having the approximately uniform radius of curvature.

2. The pair of rotating tools for double-sided friction stir welding according to claim 1,
   wherein each of the end portions has a diameter D (mm) that satisfies formula (3):

$$4 \times t \leq D \leq 20 \times t \quad \text{formula (3)}$$

where t stands for thickness of each metal plate (mm).

3. A double-sided friction stir welding apparatus comprising:
   a pair of rotating tools that are each disposed on one of first and second surfaces of an unwelded portion of metal plates; and
   a control device that controls operations of the rotating tools,
   the pair of rotating tools rotate in opposite directions so as to weld the metal plates together,
   wherein the rotating tools are the pair of rotating tools for double-sided friction stir welding according to claim 1.

4. A double-sided friction stir welding apparatus comprising:
   a pair of rotating tools that are each disposed on one of first and second surfaces of an unwelded portion of metal plates; and
   a control device that controls operations of the rotating tools, wherein the pair of rotating tools rotate in opposite directions so as to weld the metal plates together,
   wherein the rotating tools are the pair of rotating tools for double-sided friction stir welding according to claim 2, and
   wherein the control device controls the rotating tools in such a manner as to satisfy formulas (1) and (2) described below:

$$0 \leq \alpha \leq 3 \quad (1)$$

$$0.25 \times t - 0.2 \times D \times \sin \alpha \leq G \leq 0.8 \times t - 0.2 \times D \times \sin \alpha \quad (2)$$

α(°): inclination angle of rotating tool, G(mm): distance between end portions of pair of rotating tools.

5. A double-sided friction stir welding method by which metal plates are welded together by using a pair of rotating tools that are each disposed on one of first and second surfaces of an unwelded portion of the metal plates such that the rotating tools rotate in opposite directions,
   wherein the pair of rotating tools for double-sided friction stir welding according to claim 1 are used as the rotating tools.

6. A double-sided friction stir welding method by which metal plates are welded together by using a pair of rotating tools that are each disposed on one of first and second surfaces of an unwelded portion of the metal plates such that the rotating tools rotate in opposite directions,
   wherein the pair of rotating tools for double-sided friction stir welding according to claim 2 are used as the rotating tools, and
   wherein an inclination angle α(°) of each of the rotating tools and a distance G (mm) between end portions of the pair of rotating tools are set to satisfy formulas (1) and (2) described below:

$$0 \leq \alpha \leq 3 \quad (1)$$

$$0.25 \times t - 0.2 \times D \times \sin \alpha \leq G \leq 0.8 \times t - 0.2 \times D \times \sin \alpha \quad (2).$$

7. The pair of rotating tools for double-sided friction stir welding according to claim 1, wherein a height dv (mm) of the convex curved surface and a diameter D (mm) of the end portion of the rotating tool satisfy the following relational formula (4)

$$dv/D \leq 0.06 \quad \text{formula (4)}$$

8. The pair of rotating tools for double-sided friction stir welding according to claim 1, wherein a depth dc (mm) of the concave curved surface and a diameter D (mm) of the end portion of the rotating tool satisfy the following relational formula (5)

$$dc/D \leq 0.03 \quad \text{formula (5)}$$

* * * * *